United States Patent [19]
Jordan et al.

[11] Patent Number: 6,100,936
[45] Date of Patent: Aug. 8, 2000

[54] MULTIPLE-SCREEN VIDEO ADAPTER WITH TELEVISION TUNER

[75] Inventors: Douglas A. Jordan, Lawrenceville; Bruce L. Biskey, Cumming; Ezra Mintz, Atlanta; Thomas D. Young, Grayson, all of Ga.

[73] Assignee: Colorgraphic Communications Corporation, Atlanta, Ga.

[21] Appl. No.: 09/479,129

[22] Filed: Jan. 7, 2000

Related U.S. Application Data

[63] Continuation of application No. 08/922,614, Sep. 3, 1997, Pat. No. 6,028,643.

[51] Int. Cl.⁷ .............................. H04N 7/00; H04N 5/445
[52] U.S. Cl. ........................ 348/552; 348/569; 348/553
[58] Field of Search .................................... 348/552, 553, 348/555, 563, 569; H04N 5/445, 7/00

[56] References Cited

U.S. PATENT DOCUMENTS

| | | |
|---|---|---|
| 4,680,629 | 7/1987 | Fukushima et al. . |
| 4,746,983 | 5/1988 | Hakamada . |
| 5,045,946 | 9/1991 | Yu . |
| 5,140,425 | 8/1992 | Yamaguchi et al. . |
| 5,285,284 | 2/1994 | Takashima et al. . |
| 5,434,624 | 7/1995 | Ishimura . |
| 5,438,372 | 8/1995 | Tsumori et al. . |
| 5,448,315 | 9/1995 | Soohoo . |
| 5,502,808 | 3/1996 | Goddard et al. . |
| 5,504,535 | 4/1996 | Abe . |
| 5,557,342 | 9/1996 | Eto et al. . |
| 5,592,234 | 1/1997 | Gardner et al. . |
| 5,594,859 | 1/1997 | Palmer et al. . |
| 5,606,656 | 2/1997 | Yamaguchi . |
| 5,610,663 | 3/1997 | Nan et al. . |
| 5,615,338 | 3/1997 | Poole et al. . |

FOREIGN PATENT DOCUMENTS

| | | |
|---|---|---|
| 0 553 549 A1 | 8/1993 | European Pat. Off. . |
| 0 574 748 A2 | 12/1993 | European Pat. Off. . |
| 0 579 402 A1 | 1/1994 | European Pat. Off. . |
| WO 93/21574 | 10/1993 | WIPO . |
| WO 97/04382 | 2/1997 | WIPO . |

OTHER PUBLICATIONS

Annex to Form PCT/ISA/206—Communication Relating to the Results of the Partial International Search dated Jan. 20, 1999.

International Search Report in corresponding International Application No. PCT/US98/18149 dated May 27, 1999.

*Primary Examiner*—Sherrie Hsia
*Attorney, Agent, or Firm*—James L. Ewing, IV; Kilpatrick Stockton LLP

[57] ABSTRACT

Video adapter hardware and software permitting the display of computer information and television signals across several display devices. The video adapter hardware includes two graphics user interface accelerators, two television tuners, one or more video decoders, and one or more video multiplexers. Each accelerator is coupled to a memory unit for access to graphics data. One television tuner accepts input from an outside television source, such as a cable television company or a video cassette recorder. In addition, the video multiplexers accept input from other external video sources. Video data is output from the graphics accelerators to multiple screens. Video adapter software displays a tool window allowing the user to select first input for the first display device and a second input for the second display device. The software displays the results of the two inputs on the respective display devices. If the inputs are identical, however, the information may be displayed across both display devices.

20 Claims, 26 Drawing Sheets

MULTIPLE-SCREEN VIDEO ADAPTER WITH TELEVISION TUNER

This application is a continuation of U.S. Ser. No. 08/922,614 entitled "Multiple-Screen Video Adapter with Television Tuner" filed on Sep. 3, 1997, now allowed U.S. Pat. No. 6,028,643.

BACKGROUND OF THE INVENTION

1. Field of the Invention

The present invention is directed to video adapters for use in personal computers and software for controlling the same. More particularly, the video adapter of the present invention includes at least two television tuners and sends video data to multiple computer displays.

2. Background

Video adapters (or "video cards") convert computer data to video signals for output to a monitor or similar output device. A typical Video Graphics Array ("VGA") card has its own memory and digital-to-analog converter ("DAC"), but does not actually process data, which is performed by the computer's CPU, including writing and reading of text, as well as drawing simple graphics primitives such as pixels, lines and memory transfers for images.

Programs such as DOS-based word processors run in VGA text mode while graphics-based programs like games run in graphics mode. The operating system sold under the trademark Windows 3.1 by Microsoft Corp. runs in VGA graphics mode as default, meaning that every pixel that is displayed as a part of the background, a window, or a text character must be written using basic VGA calls. The low-level nature of the VGA command set dictates that numerous commands be required to do something as simple as moving or closing a window. Clearly, an enormous amount of data is required to move from the VGA card, along the bus, into the CPU, and on into the card's memory, and vice-versa.

Accelerated video cards, however, have their own processor (or "accelerator"). Thus, an accelerated card may perform many video operations with only minimal input from the CPU. Indeed, the accelerated video card can perform all of the operations usually performed by the CPU with a VGA card. This frees the bus and the CPU to execute other tasks, and speeds-up video operation. Unlike VGA mode, where every pixel must be moved to and from the card via the bus and CPU, the accelerated card can perform the same operations with instructions consisting of only a few bytes being transferred along the bus. This results in an enormous performance gain for most common graphics operations, including bitmap and pixmap transfers and painting, movement of sprites and icons, opening and closing of windows, etc.

The increased performance of accelerated cards has permitted the introduction of more advanced graphics features. For instance, certain advanced accelerated cards now feature television tuning capabilities. Television cards include a television tuner capable of receiving and tuning a video source from a cable or a video cassette recorder. The card then converts the incoming video source into a signal that may be displayed on a conventional computer monitor. Cards with television tuners typically have additional processing and memory requirements.

Television-tuning video cards have numerous real-world applications. Medical personnel, for instance, may require video images together with computerized data during surgery. Seismic technology experts must locate, use, and analyze video tape of areas along fault lines or experiencing minor seismic activity. In the business arena, securities and commodities brokers rely upon several television and computer screens to advise their clients.

As more video data becomes necessary, the need for additional screens increases. The number of available screens, however, is limited by the number of available expansion slots within the computer. As more screens are needed, additional cards may be added. Most of today's computers include at least six expansion slots that may be used for additional monitors or for other peripherals. Additionally, under the current paradigm, each screen must typically be supported by its own CPU. This additional "footprint" requirement is an unwelcome encroachment on, for example, the desk or floor space of stockbrokers. It would be advantageous to support multiple displays from a single CPU.

Unfortunately, as a greater number of peripherals hit the market, the number of expansion slots appears to be dwindling. In other words, sound card manufacturers, zip drive makers, and CD-ROM drive makers are competing for the same finite number of expansion slots within each computer. Moreover, differing bus standards, such as PCI and ISA, further limit the number of expansion slots. Thus, a card having a PCI bus interface would be limited to the number of PCI bus expansion slots in the computer.

The addition of multiple graphics cards has the further disadvantage of requiring the user to control each screen independently. If two cards are provided by different manufacturers, the software utilities for each card may not be compatible. Even if two cards from the same manufacturer are used, there is no guarantee that the software required to run both cards will run seamlessly and without error. The user may become confused when faced with numerous video inputs and outputs to manage.

SUMMARY OF THE INVENTION

The present invention provides hardware and software devices for displaying video information across one or more screens. In addition, television tuning capabilities permit the display of television signal on one or more display devices. The video adapter hardware of the preferred embodiment of the present invention includes two graphic user interface accelerators. Each accelerator is coupled to an independent memory unit and a shared memory-unit. The adapter communicates with the computer's main CPU over the internal bus via a bus interface. A bus bridge handles data flow and concurrency issues between the two accelerators. The adapter further includes several video inputs. Two television tuners accept external television signals from an outside source, such as a cable television company or a video cassette recorder. The television tuners tune the signal from the outside source and pass the data to a video multiplexers which routes the video source to one or both of the graphics accelerators via a video decoder. The adapter may further include an audio multiplexer/sound processor for processing audio data.

The graphics accelerators process data from the bus bridge and the video decoders. The video data may then be sent to one or more computer monitors for display. The accelerators send data to the monitors via a video monitor interface. Data may be displayed on one monitor, alone, or across several monitors. Multiple adapters may be used to add additional monitors.

To facilitate the display of information across various display devices, a preferred embodiment of the present invention further includes video adapter software. The software includes a tool window that allows the user to modify the video and audio inputs and outputs. In addition, the user may select particular audio and video characteristics of the active window. Specifically, the tool window includes a video output window that provides a choice of inputs for each display device. The user may select a television source or an external source for each display device. If the same input is selected for both display devices, the information will be displayed across multiple display devices. As additional cards, are added, more display devices become available.

In accordance with the purpose of the invention, as embodiment and broadly described herein, the invention is a video adapter for use in a computer having an internal bus, the video adapter comprising a first graphic user interface accelerator, a second graphic user interface accelerator, at least one video decoder coupled to at least one of the first and second graphic accelerators, a first television tuner receiving a first television signal, a second television tuner receiving a second television signal, a mechanism for coupling the first and second television tuners to the at least one video decoder, and a plurality of video monitor outputs.

In further accordance with the purpose of this invention, as embodied and broadly described herein, the invention is a method for displaying information on multiple computer screens, comprising the steps, performed by a computer, of displaying a tool window, wherein a first screen output window having a group of selectable inputs, and a second screen output window having a group of selectable inputs, are displayed; inputting an indication that a user wishes to select a first input for the first screen output; inputting an indication that a user wishes to select a second input for the second screen output; displaying results of the first input on the first screen; and displaying results of the second input on the second screen.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DETAILED DESCRIPTION OF THE PREFERRED EMBODIMENT

Reference will now be made in detail to a preferred embodiment of the invention, examples of which are illustrated in the accompanying drawings. Wherever possible, the same reference numbers will be used throughout the drawings to refer to the same or like parts.

I. Overview of the Present Invention

Figure 1:
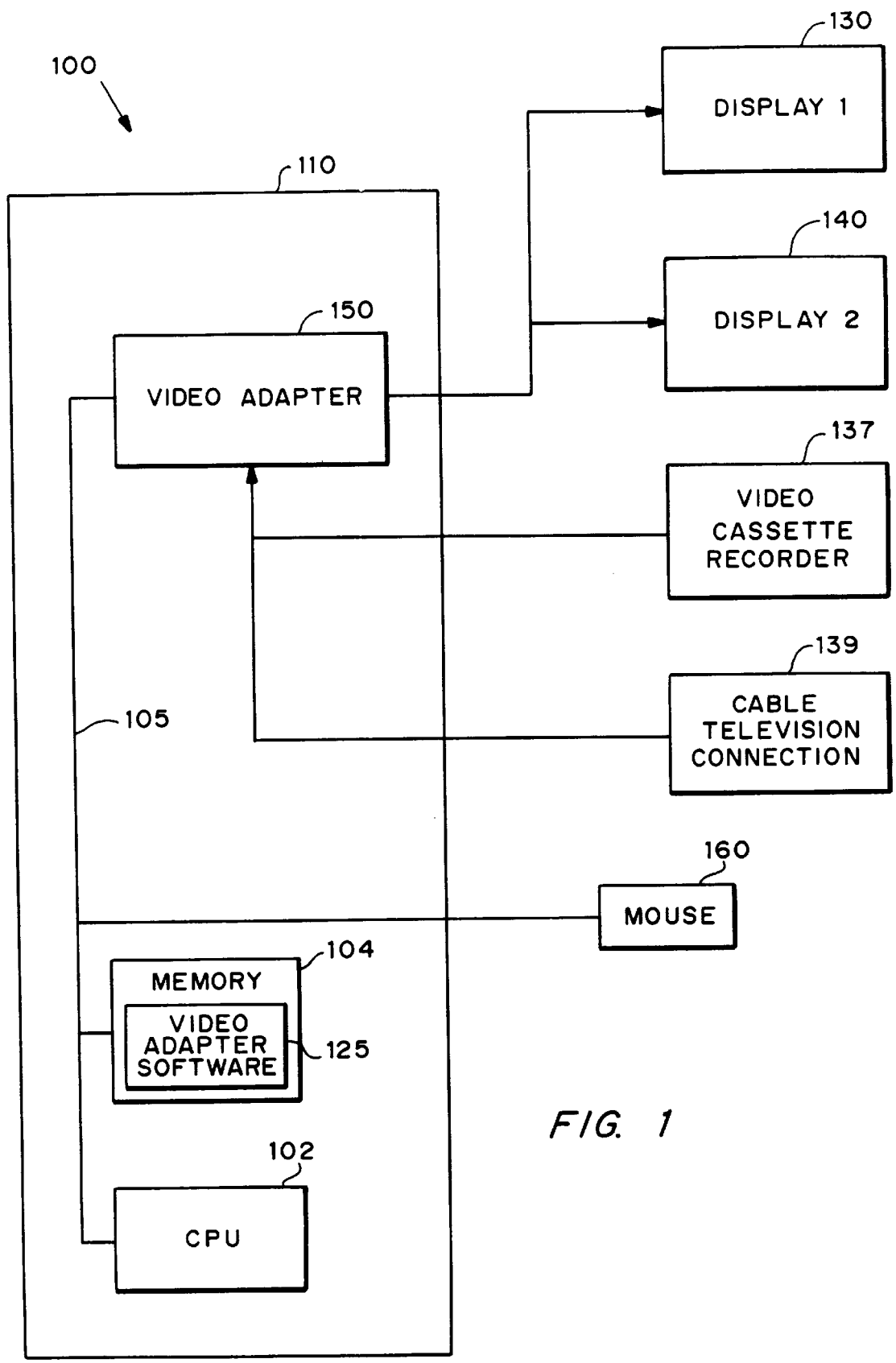
FIG. 1 is a functional block diagram of a computer system using the video adapter and video adapter software according to a preferred embodiment of the present invention.

FIG. 1 is a block diagram of a computer system 100 in accordance with a preferred embodiment of the present invention. Computer system 100 includes a computer 110. Computer 110 includes a CPU 102, a memory 104, a bus 105, a first display device 130 (e.g., a computer monitor), a second display device 140, an input device 160 (e.g., a mouse), and a video adapter 150 coupled to the first display device 130 and the second display device 140 by electrical connections. Video adapter 150 is further coupled to two video sources, a video cassette recorder 137 and a cable television input 139. Computer system 100 can further include a second display device 140 connected to the computer by way of the video adapter 150. Memory 104 includes video graphics software 125 that controls operation of the video adapter 150. The operation of the video graphics software 125 is described in detail below. It will be understood by persons of ordinary skill in the art that computer system 100 may also include numerous elements not shown in the figure for the sake of clarity, such as disk drives, keyboards, display devices, network connections, additional memory, additional I/O elements, additional CPUs, etc.

Computer system 110 also includes an operating system (not shown), such as the Windows 95 operating system. "Windows 95" is a registered trademark of Microsoft Corp. It will be understood that the present invention is not limited to any particular hardware, operating system, or type of computer system.

II. Video Adapter Hardware

Figure 2:
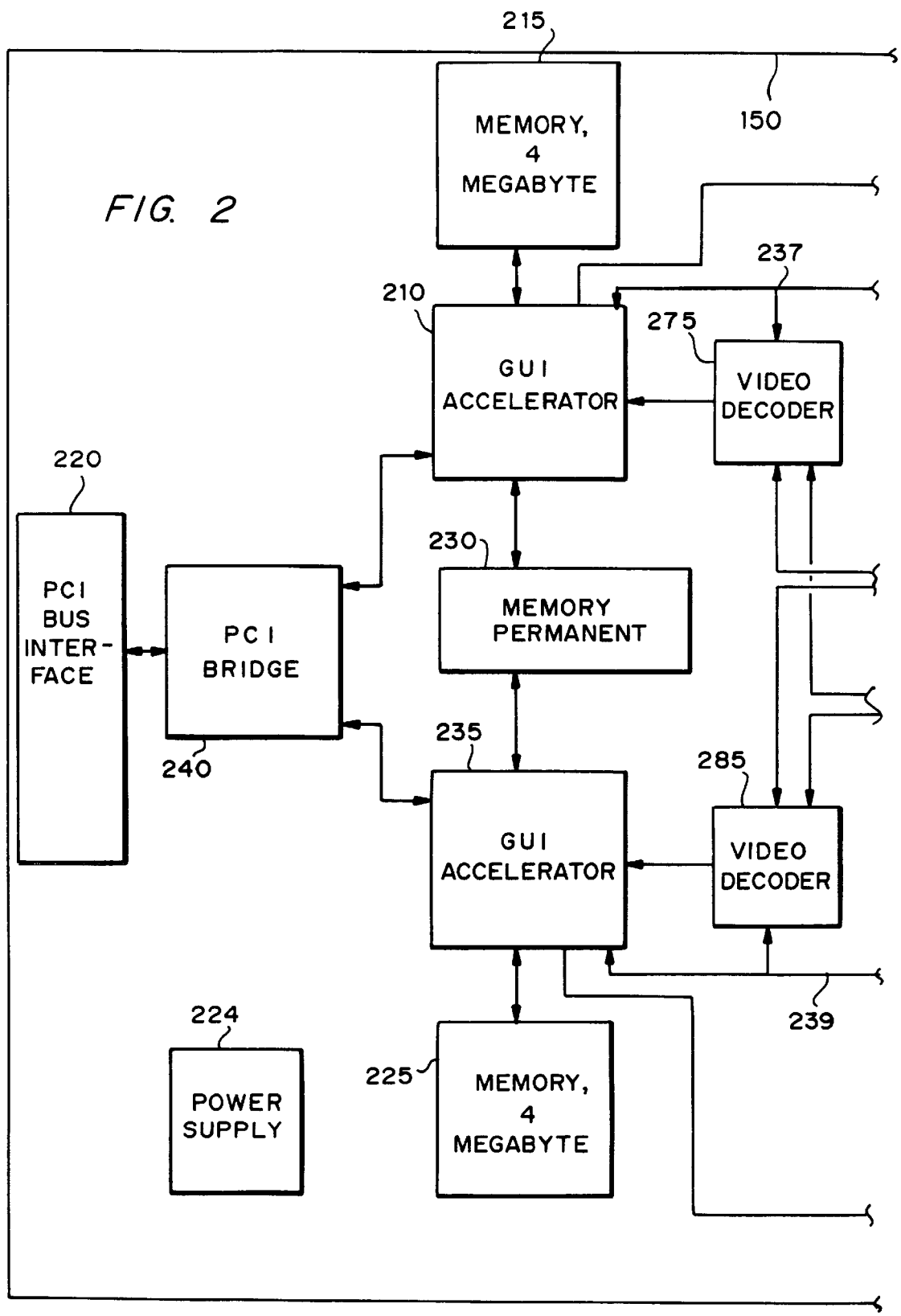
FIGS. 2 and 2A are functional block diagram of a preferred embodiment of a video adapter of the present invention.
Figure 2A:
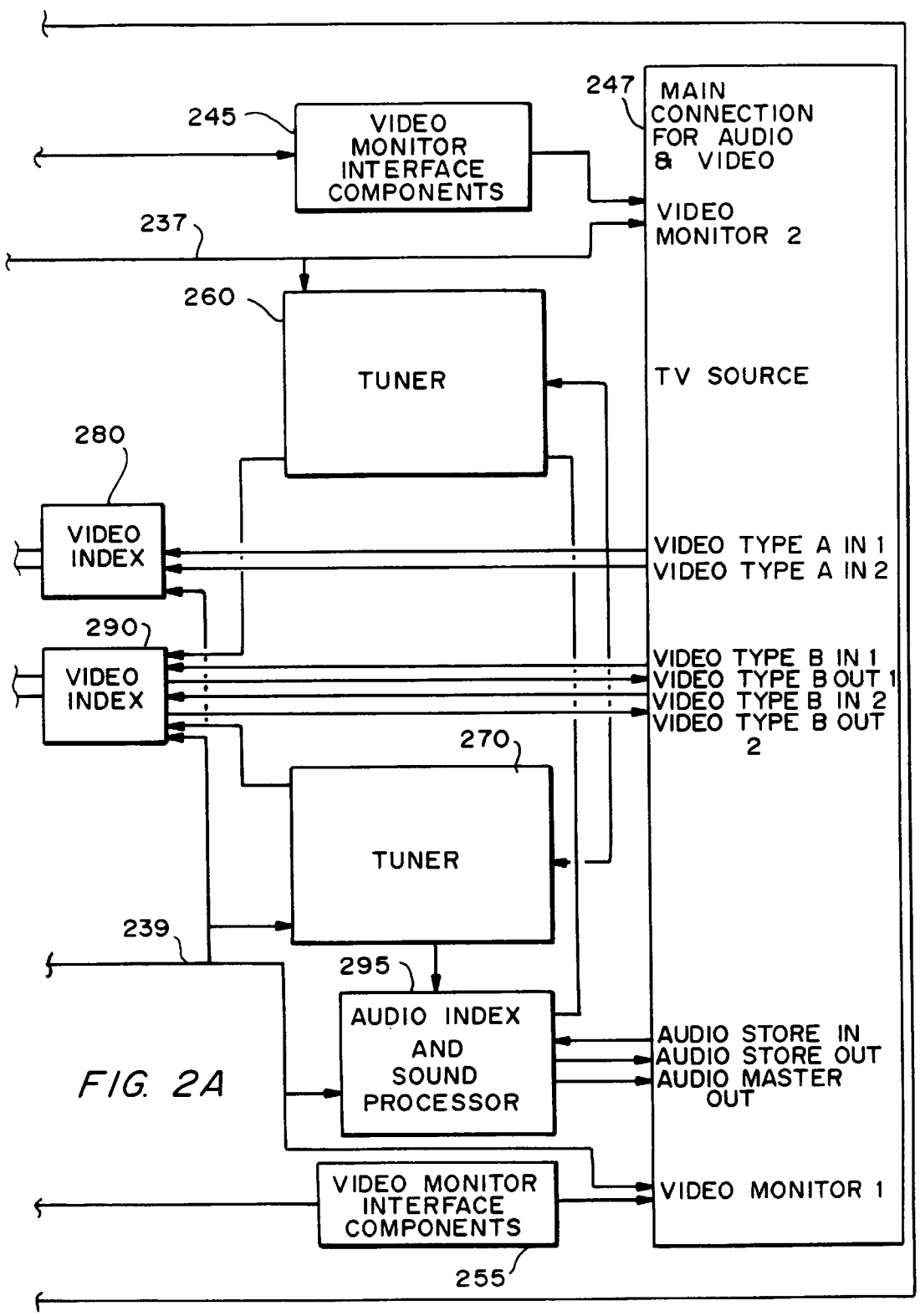

FIGS. 2 and 2A are block diagrams of the video adapter 150 of the present invention. The video adapter 150 is implemented as a circuit board having a plurality of integrated circuits mounted or etched thereon. The adapter 150 includes a 32-bit PCI Version 2.1-compliant bus interface 220 that couples with a single PCI bus expansion slot (not shown) in the computer 110. Data flows between the computer 110 and the adapter 150 through the bus interface 220. It should be apparent to one of ordinary skill in the art, however, that other bus standards, such as ISA, and other versions of PCI may be used.

The video adapter 150 processes video data from the computer 110 via a PCI bridge 240. The PCI bridge 240 bridges data from the PCI bus interface 220 to multiple accelerators on the card. The PCI bridge 240 includes control logic, concurrency control, and buffering that permit multiple accelerators to access the single PCI bus interface 220. Specifically, the bridge 240 implements delayed transactions for all PCI configurations, I/O, and memory-read commands, such that three of the aforementioned transactions may be performed simultaneously in each direction. The bridge 240 supports five simultaneous posted write commands, with 88 bytes of buffering for each command. The PCI bridge 240 further provides concurrent primary and secondary bus operation, as well as enhanced address decoding to thereby isolate traffic in both directions.

The video adapter 150 includes six distinct video inputs. Two television tuners 260, 270, each accept television signals from a cable television connection, a video cassette recorder, a television antenna, or similar television signal source. Two video multiplexer inputs 280, 290 accept phono RCA inputs from a variety of sources, including outputs from the tuners 260,270, and routes these signals to one or both of the graphics accelerators 210, 230. In addition, the multiplexer accepts two mini-DIN S Video inputs. Most audio/video connections are made through a single HD44 pin cable 247. The cable includes, but is not limited to, two HD15 VGA outputs, two RCA phono in (composite video in) inputs, two RCA phono out (routed composite video output), two Mini DIN in (S-Video input), and three Stereo mini phone jacks (Master/slave audio out, slave audio in). The tuners 260, 270 accept an F-style cable television input that is separate from the 44-pin connector.

Video decoders 275, 285 convert the analog video signals from the video multiplexers 280,290 into a digital component stream for use by the graphics accelerators 210, 235. The video decoders 275, 285 include full video acquisition capability, including text slicing for intercast, teletext, and closed-captioning capability. Numerous input formats, including NTSC-M, NTSC-44, PAL-B, PAL-G, PAL-H, PAL-I, PAL-M, PAL-N, PAL-60, SECAM, and S-VHS are supported. Computer software 125 may be used to control various video processing features via control busses 237, 239. Specifically, a user may control the hue, brightness, contrast, window cropping/scaling, horizontal and vertical resizing, and anti-aliasing features. The software 125 is discussed in greater detail below.

The adapter 150 of the present invention includes two graphic user interface ("GUI") accelerators 210,235. Each accelerator 210,235 is coupled to a memory unit 215,225. The memory units 215,225 are synchronous graphic random access memory ("SGRAM") units, although other memory types may be used. Preferably, each memory unit has a peak memory bandwidth of 800 Megabytes per second (MB/s). The memory units 215,225 store decoded video data, graphic data from computer operations, character fonts, and other information required for operation of the adapter 150. The shared memory 230 serves as the BIOS for the accelerator card 150. Rather than using two separate BIOS chips for each accelerator, the memory is shared between the two accelerators 210,235.

The GUI accelerators 210, 235 are preferably accelerators sold under the trademark CL-GD5480, by Cirrus Logic, Inc, although any graphic accelerator chip may be used. Each GUI accelerator 210,235 is a graphic visual media accelerator integrated circuit with additional graphic support logic. The GUI accelerators 210,235 support a synchronous dynamic random access memory ("SDRAM") interface, a digital camera interface, a PCI bus interface, a graphics controller, a BITBLT engine, a stream engine, a VGA graphics controller, and CRT controller functions. The GUI accelerators 210,235 combine decoded video data from the video decoders 275, 285 with the computer graphics information stored in memory 215, 225. Resultant data from the GUI accelerators 210,235 is output to computer monitors 130,140 via video monitor interface components 245,255.

The video adapter 150 may further include an audio multiplexer/sound processor 295. The audio multiplexer 295 accepts audio inputs from each of the television tuners 260,270, and an external sound source. Computer software may be used to control various audio processing features via control busses 237,239. Specifically, a user may control the volume, balance, mute control, pseudo-stereo, spatial function, treble, and bass characteristics of the audio output through the video adapter software 125. Processed audio is output to an external speaker system or amplification device.

The accelerator card 150 is powered by a power supply 224. The power supply 224 draws power from the computer's main power supply (not shown) via the PCI bus interface 220. The power drawn by the power supply 224 is then converted to the proper voltages required to power each element of the accelerator card 150. Specifically, the PCI bridge 240, the video multiplexers 280,290, the tuners 260,270, and the remaining circuitry all require different voltages. The power supply 224 converts the main voltage to a particular voltage for each card element.

III. Video Adapter Software

Figure 3:
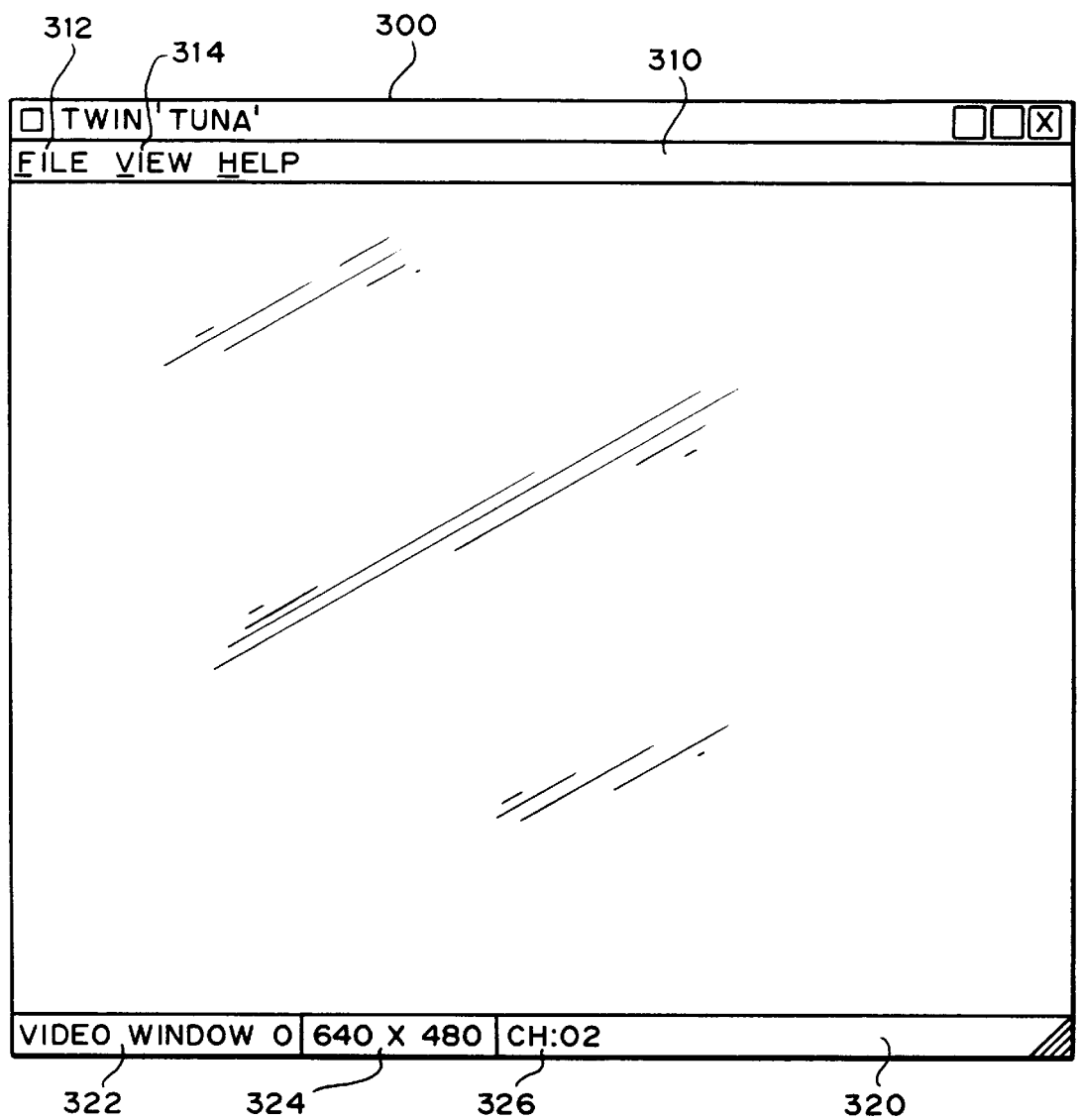
FIG. 3 shows an initial screen display of the embodiment of FIG. 1.

FIG. 3 shows an initial screen display 300 of the embodiment of FIG. 1. The screen display of FIG. 3 is the initial screen display shown when the video adapter software of the described embodiment is first executed in a Windows 95 environment. Screen display 300 includes a video area 302, a menu bar area 310, and a status bar area 320. Menu bar area 310 includes three menu items: a "File" menu item 312, a "View" menu item 314, and a "Help" menu item 316. Status bar area 320 includes three parts: a video window part 322 indicating a video window number, a resolution part 324 indicating a video resolution for the active video window, and a channel part 326 indicating a tuned channel within the active video window.

Figure 4:
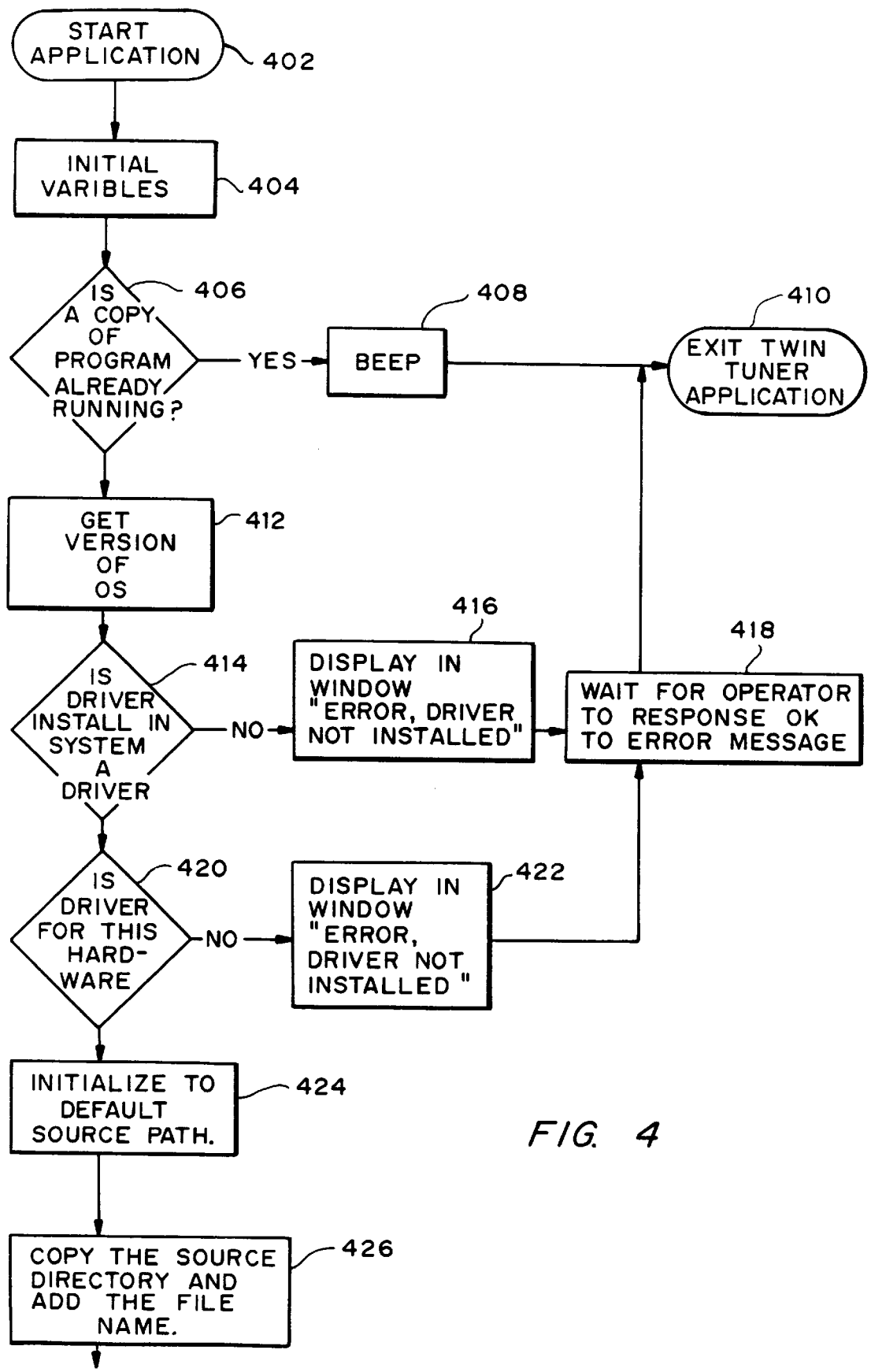
FIG. 4 is a flow chart illustrating steps performed during initialization of a preferred embodiment of video adapter software according to the present invention.

FIG. 4 is a flow chart illustrating steps performed during initialization of the video adapter software in Windows 95. (Hereinafter, the words "software" and "program" will be used interchangeably.) It will be understood by persons of ordinary skill in the art that the flow charts in this document generally represent steps performed by CPU 102 in accordance with instructions stored in memory 104. When the video adapter software is started, it first instantiates, in step 404, all variables associated with the software. In addition, when the software is first executed, the program searches the system for another running instance of the program. If another instance of the program is found, the new instance of the program must terminate. Accordingly, the software calls an operating system command to sound the internal computer bell at step 408. The new instance of the software exits the system at step 410.

In step 412, the software obtains the version number of the operating system. The software then determines, in steps 414 and 420, respectively, whether a generic driver and video-adapter-specific driver have been installed. If no generic driver is found, the program displays the message "Error: generic driver not installed" in the active window at step 416. The program then proceeds to wait for the user to issue an "OK" response to the error message. Similarly, if a video-adapter-specific driver is not found, the program displays the message: "Error: video adapter driver is not installed," in the active window at step 422. Program control continues at step 418. Following a response from the user, the software exits at step 410.

Once the appropriate device driver has been located, the software, in step 424, initializes to a default source path (disk drive location). The default source path is the path in which the software was originally installed. In step 426, the software copies the source directory and a default file name to a variable.

Figure 5:
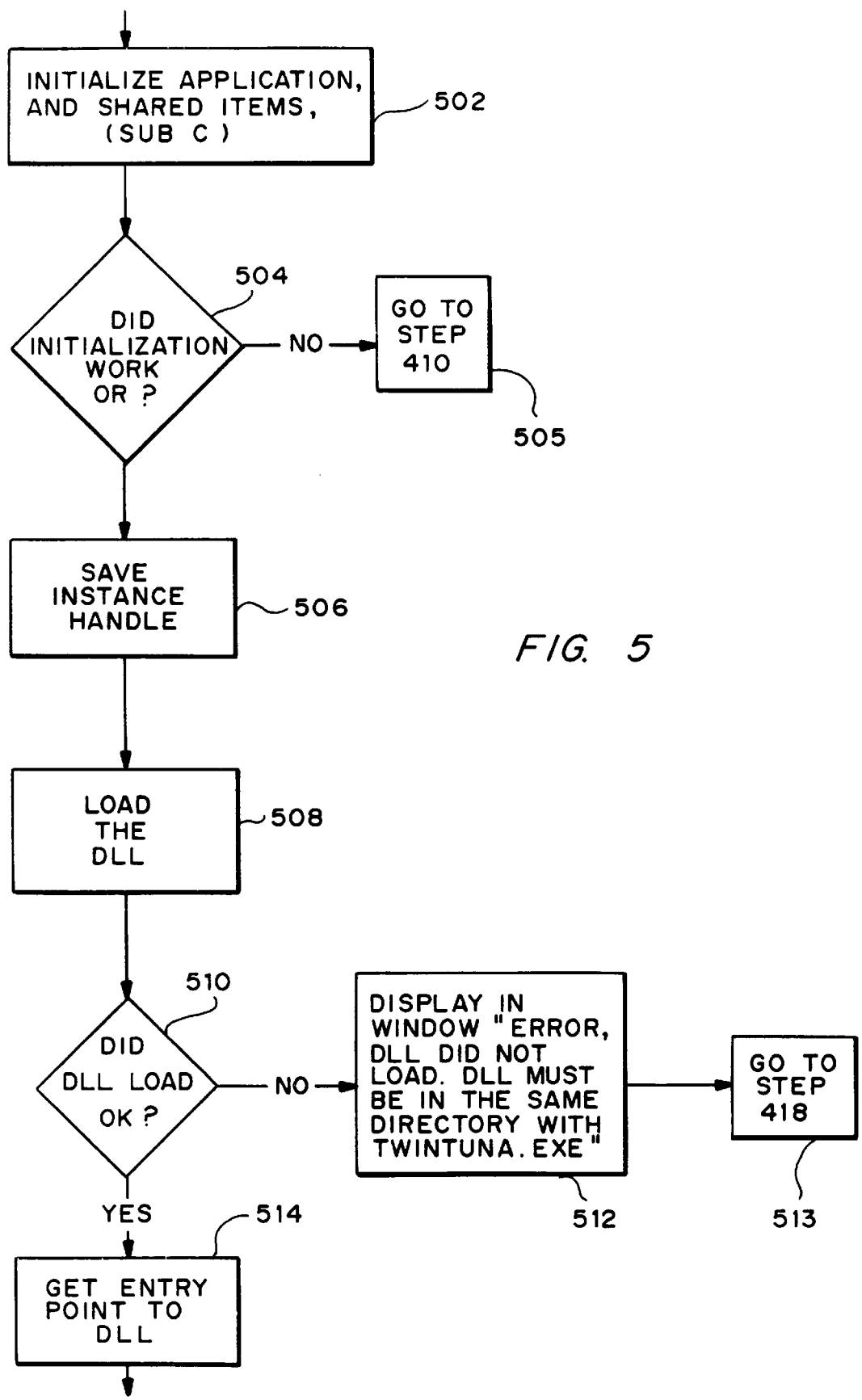
FIG. 5 is a flow chart further illustrating initialization of the video adapter software.
Figure 6:
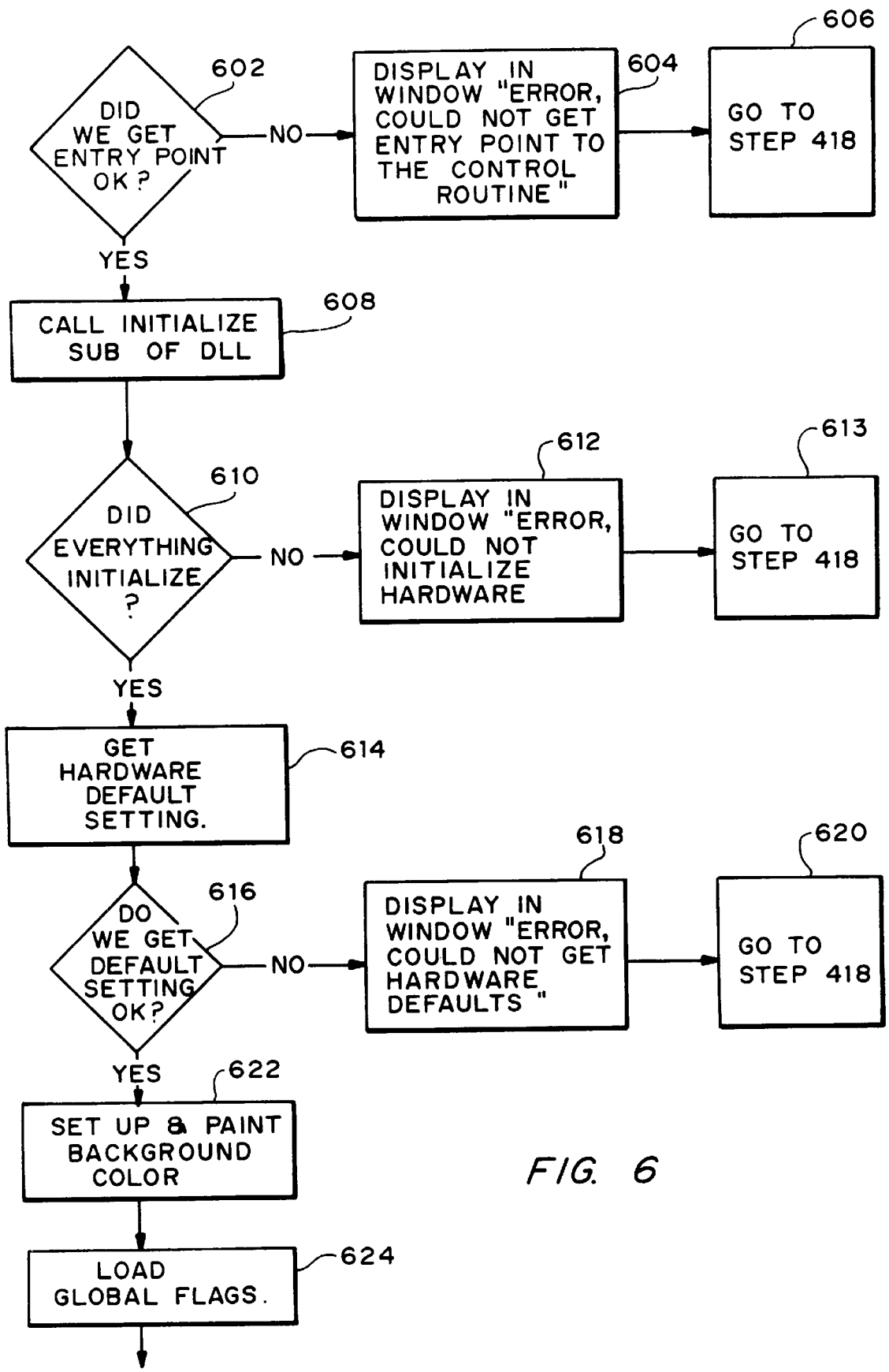
FIG. 6 is a flow chart further illustrating initialization of the video adapter software.
Figure 7:
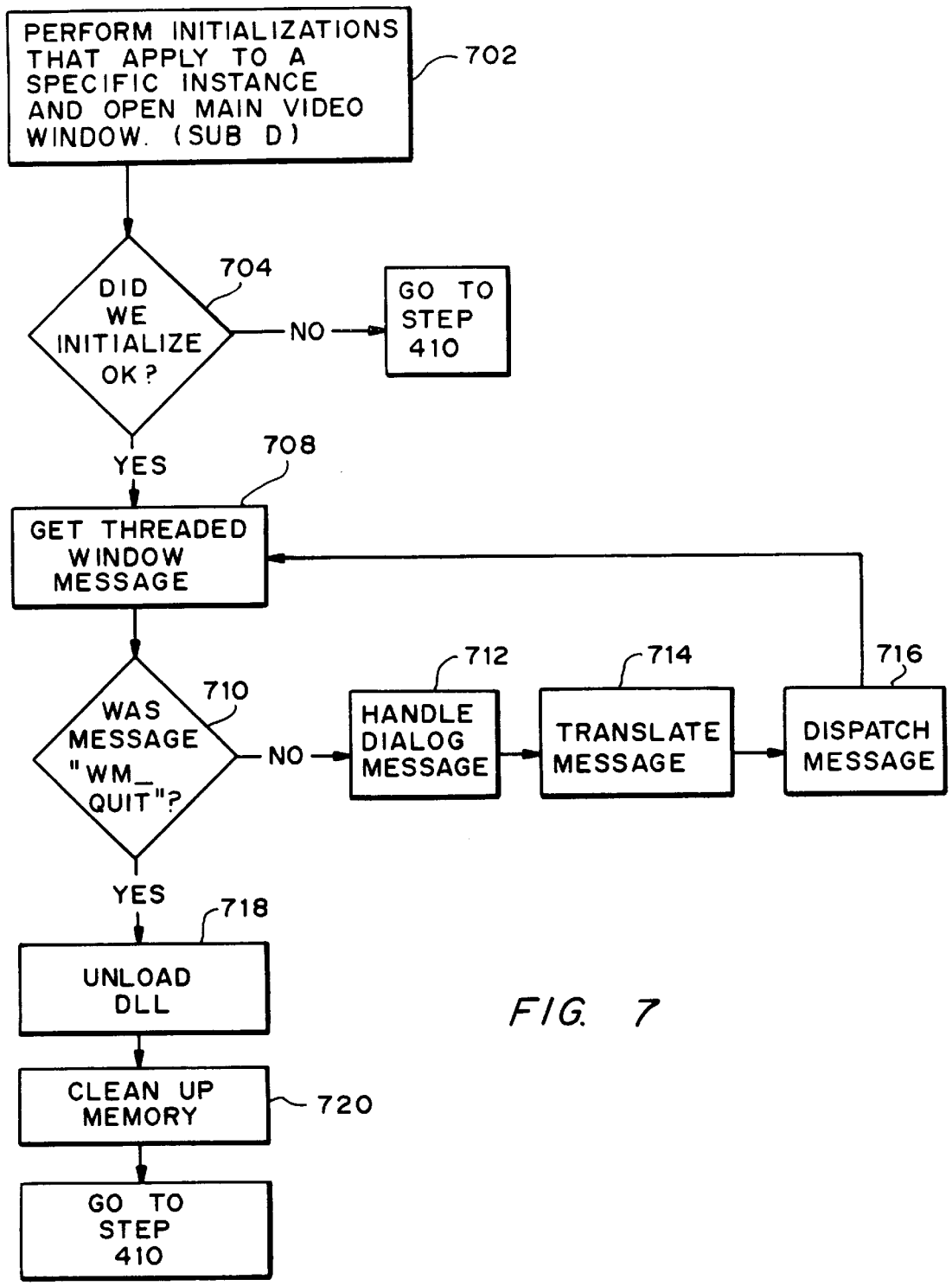
FIG. 7 is a flow chart further illustrating initialization of the video adapter software.

Program initialization continues in FIGS. 5–7. In step 502, the program goes to step 802, where an application instance and shared items are initialized by a subroutine (Subroutine C described below). If the initialization was performed without error, the program continues to step 506. Otherwise, the program goes to step 410 and terminates. In step 506, an instance handle provided by the operating system is saved in an instance handle variable. Next, the software loads an operating system dynamic link library (the "DLL") in step 508. The DLL is a library of low-level routines used to access the hardware. The primary function of the DLL is to determine the hardware present in the system and carry out the device control requests of an application. For example, the DLL turns on and off the video registers in the graphic accelerators, sets the video window size in the graphic accelerators, controls the sound process treble and bass, switches the video multiplexers to the correct source, sets the channel on the tuners, etc. The software, in step 510, checks to ensure that the DLL loads properly. If the DLL fails to load, the program displays the message: "Error: DLL did not load. DLL must be in the same directory with [XXX].exe" in the active window, where [XXX] is the name of the executable file containing the software described herein. The program then continues control at step 418. If the DLL loads properly, the software attempts to obtain the entry point for the DLL for later use in step 602. If the entry point is not obtained in step 602, the software displays the message: "Error: Could not get entry point to the control routine" in step 604 and goes to step 418 where the program eventually terminates.

Once the DLL entry point is obtained, program control continues at step 608, where the program calls an initialization subroutine of the DLL. If the DLL fails to initialize, the software, in step 612, displays the message: "Error: Could not initialize hardware" and goes to step 418. Following initialization, the software obtains the default settings for the video adapter 150 in step 614. In step 616, the software confirms the receipt of these setting. Failure to obtain the settings results in the display of the message: "Error: Could not get hardware defaults." The program would then continue at step 418. If the hardware defaults are obtained, the program creates and paints a background color for the active window in step 622. In step 624, the software loads all global flags that will be used by the operating system.

In step 702, the program goes to step 802, where the main video window is opened and instance initializations are performed by a subroutine (Subroutine D described below). If initialization is properly performed, processing continues at step 704. Otherwise, the program terminates. At step 708, the program enters a message loop to obtain threaded window messages from the operating system. If the message is "WM_QUIT," the message loop ends and program flow continues in step 718. For all other Windows messages, the program goes to step 712. The software first handles all dialog box messages. Following the processing of the dialog box message, the software translates any virtual key codes generated by Windows 95 into character messages in step 714. Once the message has been read and translated, it is dispatched back to the operating system in step 716. Windows 95 then holds this message until it can be passed to the program's window function. When the software receives a "WM_QUIT" message in step 710, it unloads the DLL from memory. In step 720, the program cleans up all memory and resources and terminates.

Figure 8:
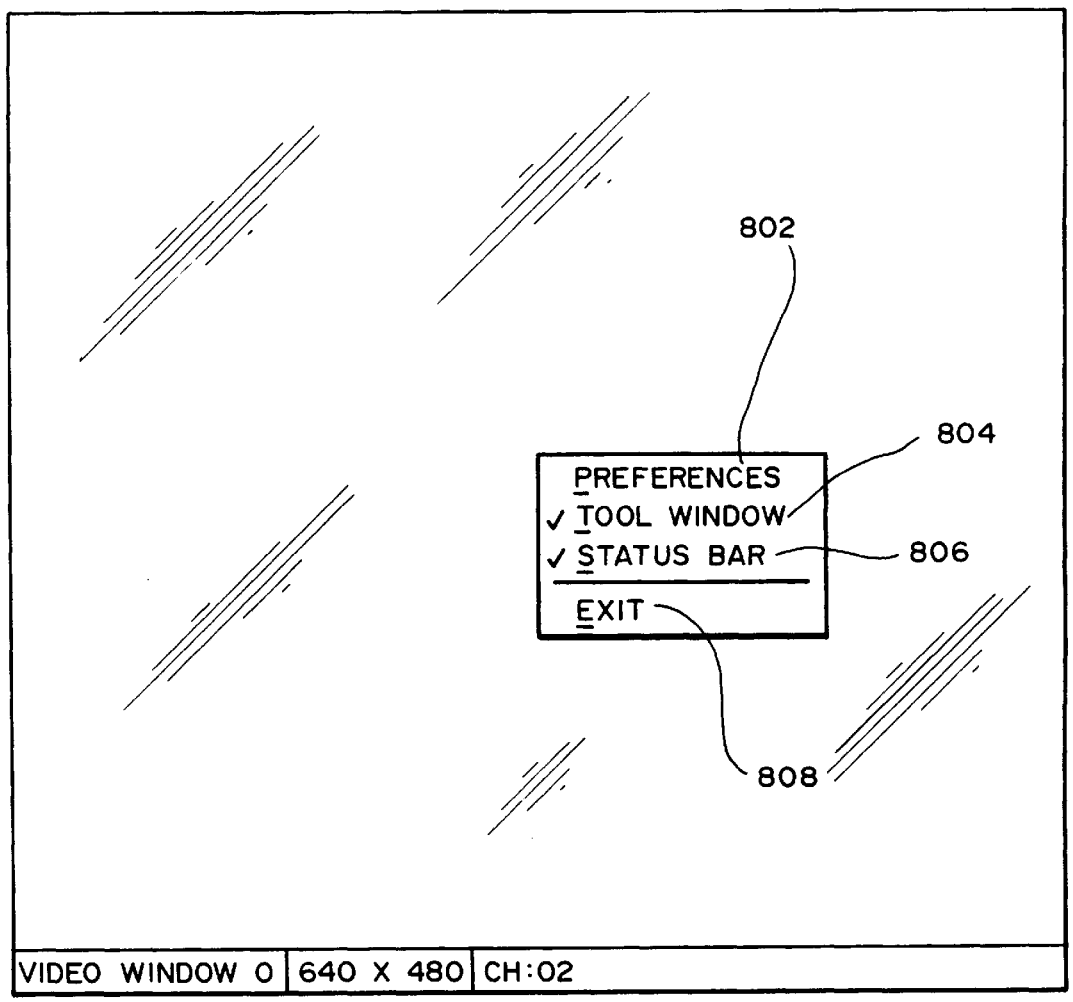
FIG. 8 is a screen illustrating a pop-up menu displayed when the user right-clicks in the video window of a display according to a preferred embodiment of the present invention.

FIG. 8 is a screen illustrating a pop-up menu created by subroutine C and displayed when the user right-clicks in the video window. The pop-up menu includes five menu items: a "Preferences " menu item 802, a "Tool Window" menu item 804, a "Status Bar" menu item 806, a blank line, and an "Exit" menu item 808. Each of these items is described in detail in the discussion of menu processing below.

Figure 9:
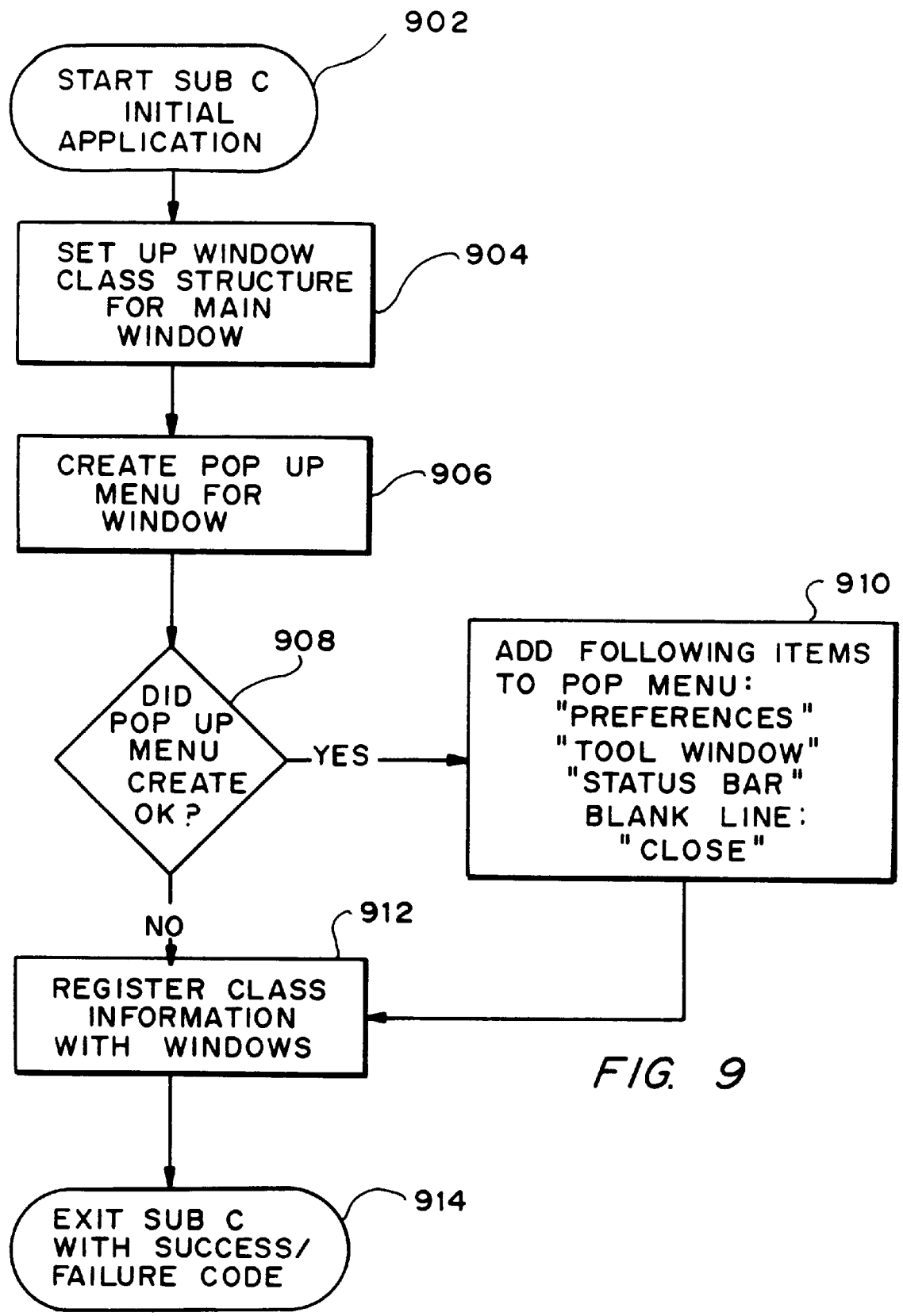
FIG. 9 is a flow chart describing the steps of a menu subroutine in a preferred embodiment of software according to the present invention.

FIG. 9 is a flow chart describing the steps of subroutine C, which is called from other points in the program. Subroutine C begins processing at step 902. In step 904, the routine defines a window class structure for the main window. The window class structure includes the default fields for the WNDCLASS structure. The instance handle obtained in step 506 is used to define the HINSTANCE field of the structure. In step 906, a pop-up menu is created for the defined window. The software in step 908 ensures that the pop-up menu was created properly. If the menu was properly created, the software creates the menu items. Once the menu items have been created, the window class is registered with the operating system in step 912. The software exits Subroutine C in step 914.

Figure 10:
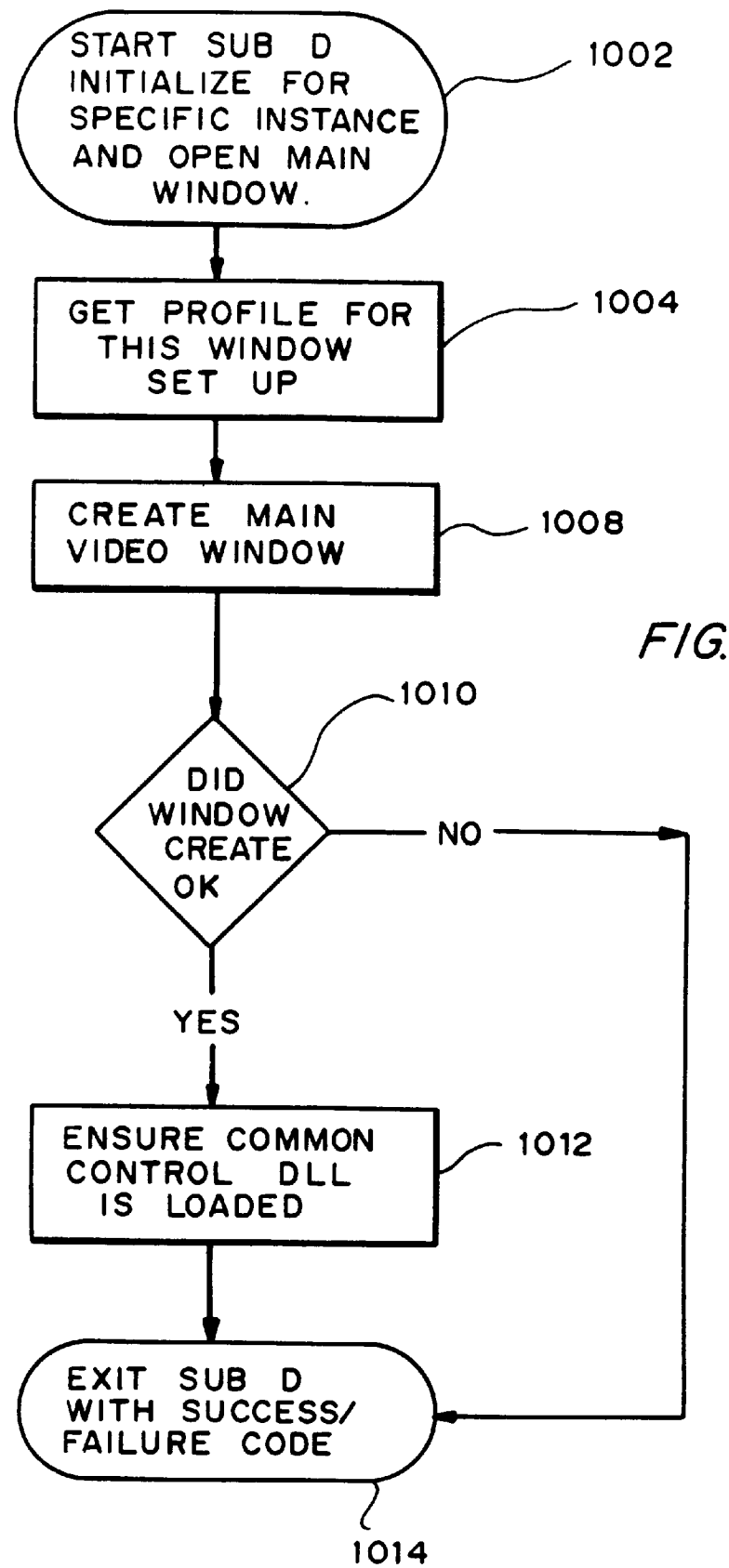
FIG. 10 is a flow chart describing the steps of a main window subroutine in preferred embodiment of software according to the present invention.

FIG. 10 is a flow chart illustrating subroutine D, which is called from other points in the program. The subroutine begins at step 1002. At step 1004, the software obtains the proflie for the window set-up. Specifically, the software obtains the size of the window and the current input settings for the window. These are usually saved from a previous session. If no settings have been saved, the software will use default window settings. The main video window is created at step 1008. If the main window is properly created, the software goes to step 1010. Otherwise, the subroutine exits with a failure code. Once the window is created, however, program control continues at step 1012 where the software ensures that the Windows 95 common control DLL is loaded. The common controls are an extended set of controls, such as drag list boxes, rich edit controls, and toolbars, that are used by the software. If the common control DLL is properly loaded, the subroutine exits with a success code at step 1014.

Figure 11:
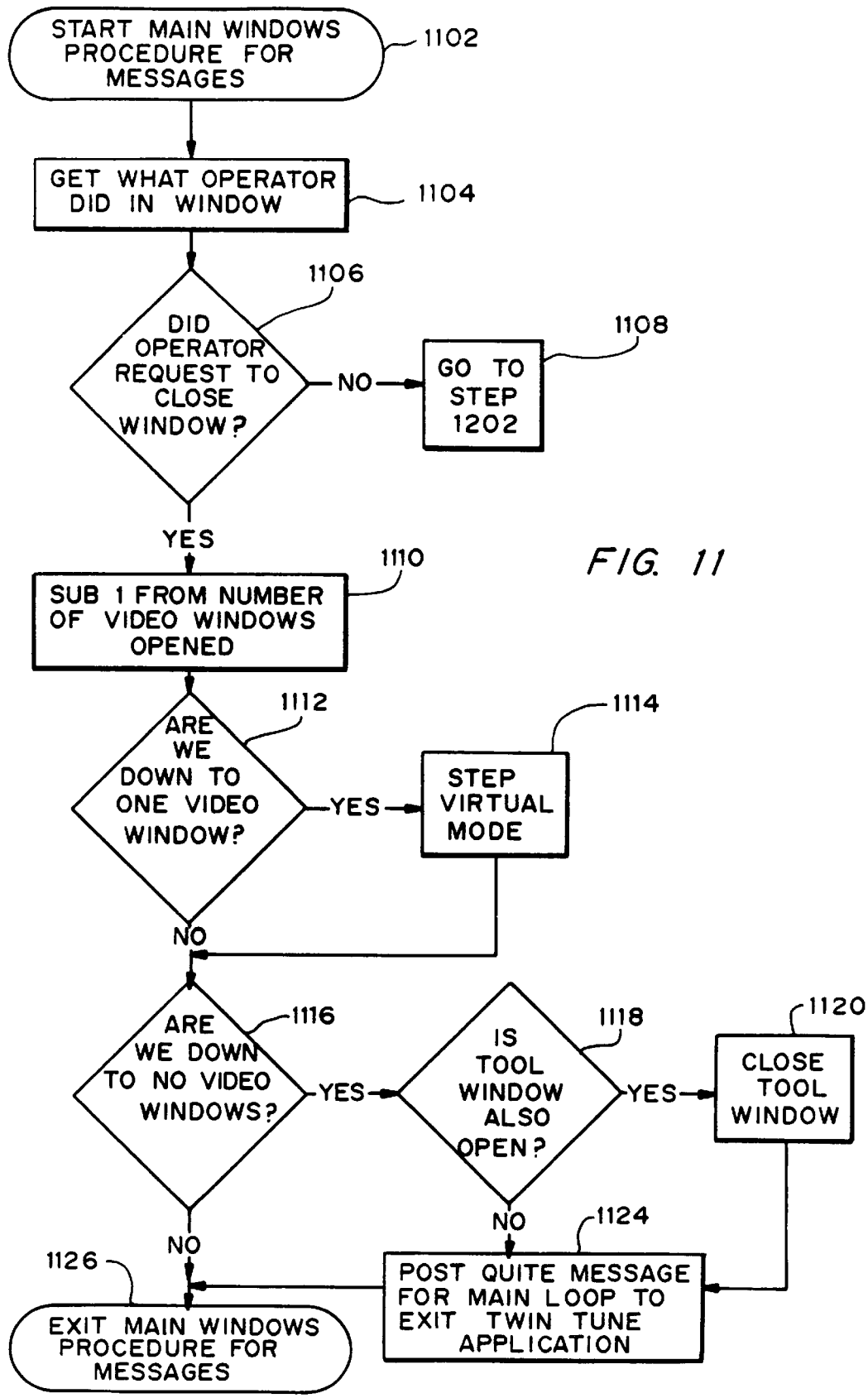
FIG. 11 is a flow chart illustrating control flow of the main Windows procedure for the software.

FIG. 11 is a flow chart illustrating control flow of the main Windows procedure for the software. The Windows procedure is called by Windows 95 when it needs to pass a message to the software. It is through this function that Windows 95 communicates with the program. The Windows function may be implemented in many ways, but it often consists of a "switch" statement that links a specific response to each message that the program will respond to. In step 1104, the software obtains the user's action within the main window. In step 1106, the software determines whether the user requested to close a window. If the user requested that the window be closed, processing continues at step 1202. Otherwise, processing continues at step 1110, where the software subtracts one from the total number of open windows. If only one window remains open, the software places the open window in virtual mode in step 1114. Virtual mode allows a single video window to be moved from one display to another or sized to fit on more than one display. This mode allows more than one video window to be opened at one time. If no video windows are open following step 1110, the software goes to step 918 to determine whether the tool window remains open. If the tool window is open, the software closes the tool window in step 1120. Once the tool window is closed, (or if the tool window was not open in step 1118), the windows procedures calls the PostQuitMessage( ) function of the operating system which, in turn, causes a WM_QUIT message to be sent to the software. Once a WM_QUIT message is received, the software automatically halts. The Windows procedure exits at step 1126.

Figure 12:
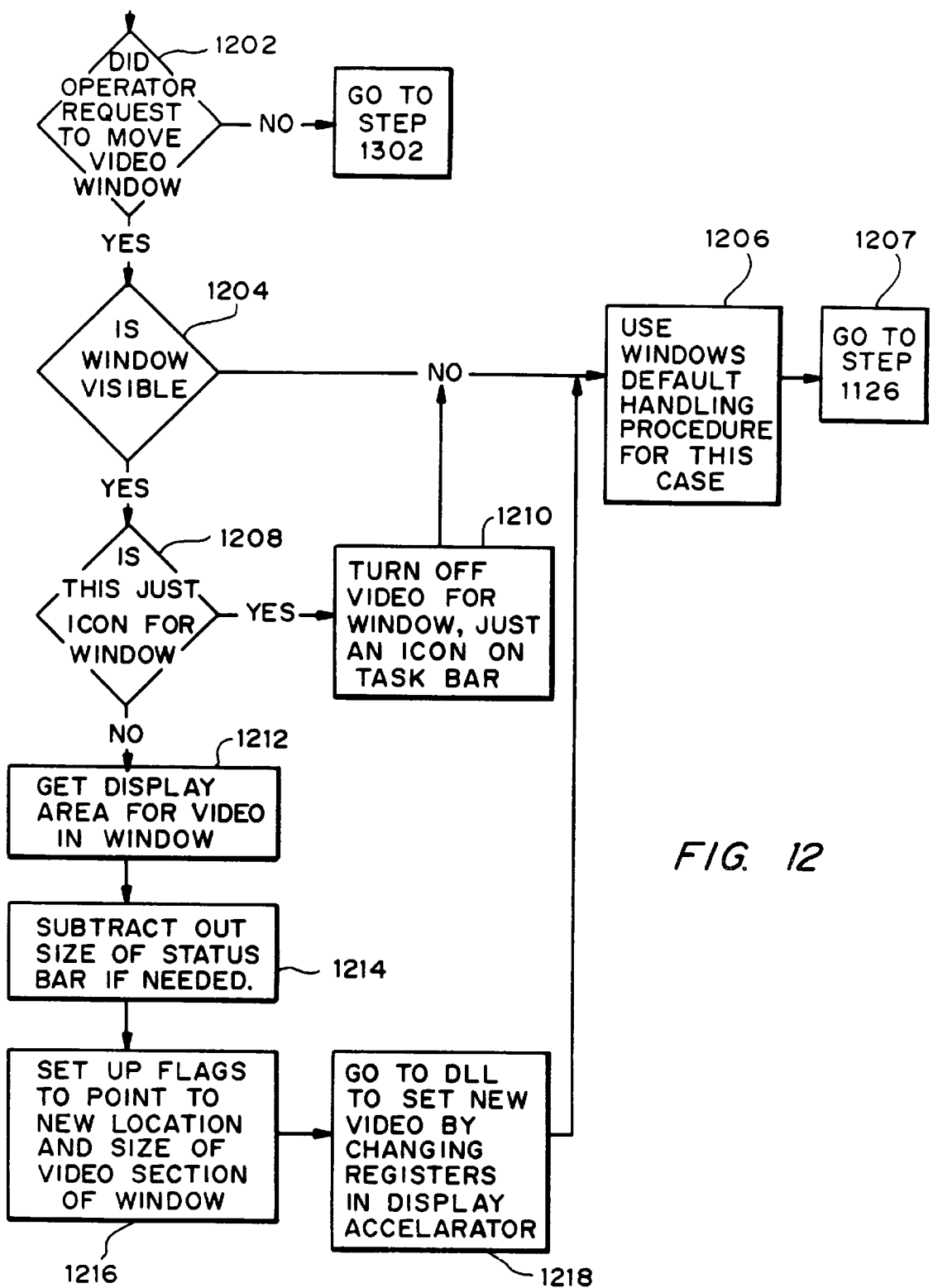
FIG. 12 illustrates processing that occurs when the user requests that a window be moved in a preferred embodiment of software according to the present invention.

FIG. 12 illustrates processing that occurs when the user requests that a window be moved. In step 1202, the software determines whether or not the user requested that a video window be moved. If a move was not requested, processing continues at step 1302. Otherwise, the software ensures that the video window is currently visible. If the window is not visible, the default Windows processing occurs (via a call to DefWindowProc( )). If the window is visible, the software ensures that the window is not simply an icon in step 1208. In step 1210, if the video cannot be displayed on the screen, such as by minimizing, the software turns off any video that is being sent to the window. In step 1212, the software obtains the display area for the video in the window. Next, the size of the status bar for the window is subtracted from the area. In step 1216, the software creates flags to point to the new location and size of the video portion of the window. The software then enters the DLL to set the new video by modifying the registers in the display adapter accelerator associated with a given window. If the window is the first-opened window, the registers in graphics accelerator 210 are modified. If the window is the second-opened window, the registers in graphics accelerator 235 are modified. All other messages for moving are sent to the default handling for the Windows procedure.

Figure 13:
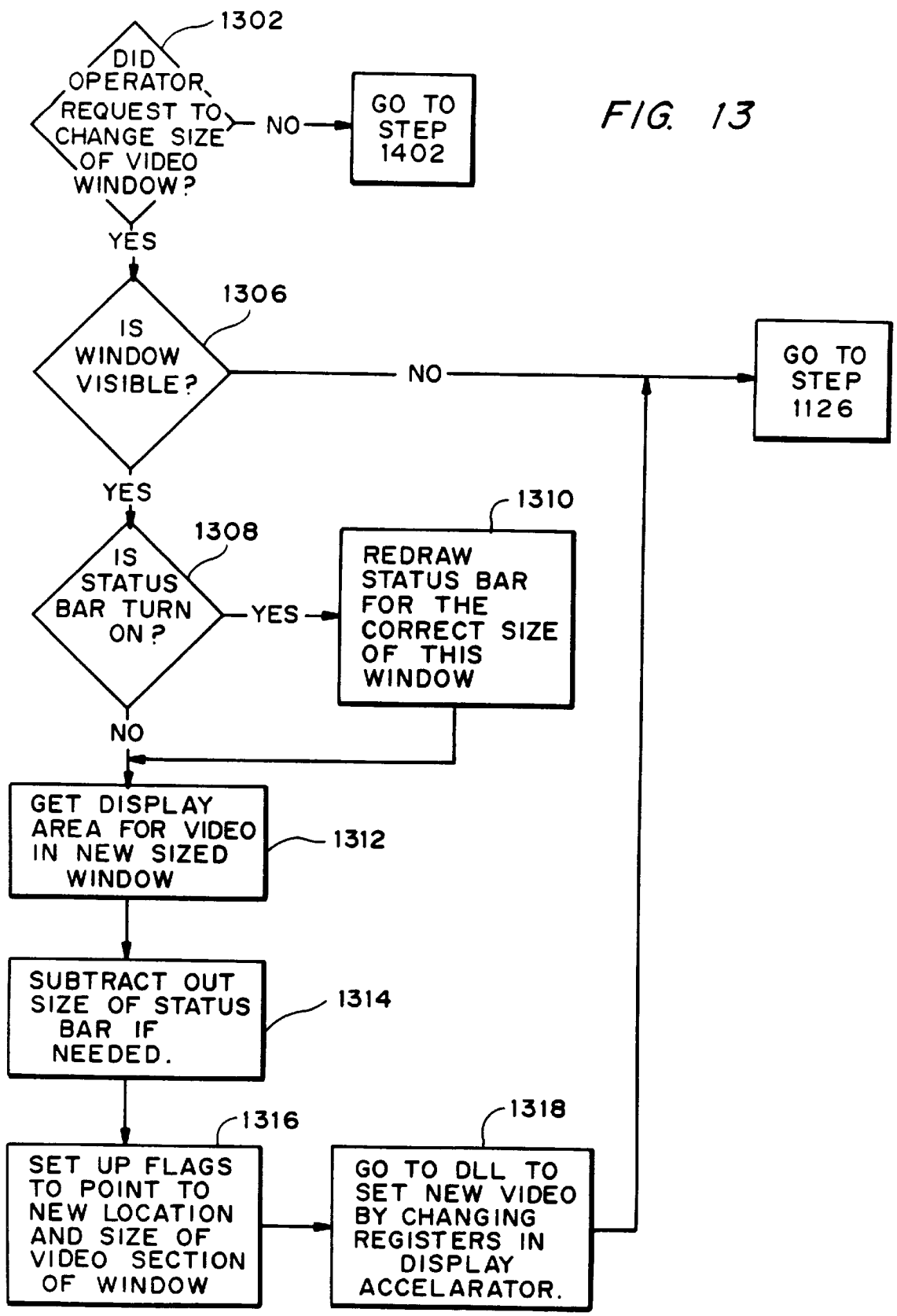
FIG. 13 illustrates processing that occurs when the user requests that the window be re-sized in a preferred embodiment of software according to the present invention.

FIG. 13 illustrates processing that occurs when the user requests that the window be re-sized. The software, in step 1302, determines whether the user requested that the size of the window be modified. If the user did not request a window re-sizing, processing continues at step 1402. Otherwise, the software determines whether the window to be sized is visible. If the window is not visible, the default Windows procedure handling is used. If the window is visible, the software ensures that the status bar is visible. If the status bar is visible, the software redraws the status bar for the correct window size in step 1310. If the status bar is not present, the software obtains the display area for the video in the newly-sized window. The size of the status bar is subtracted from the total area in step 1314. In step 1316, the software creates flags to point to the new location and size of the video portion of the window. The software then enters the DLL to set the new video by modifying the registers in the display adapter accelerator. If the window is the first-opened window, the registers in graphics accelerator 210 are modified. If the window is the second-opened window, the registers in graphics accelerator 235 are modified. All other messages are sent to the default handling for the Windows Procedure.

Figure 14:
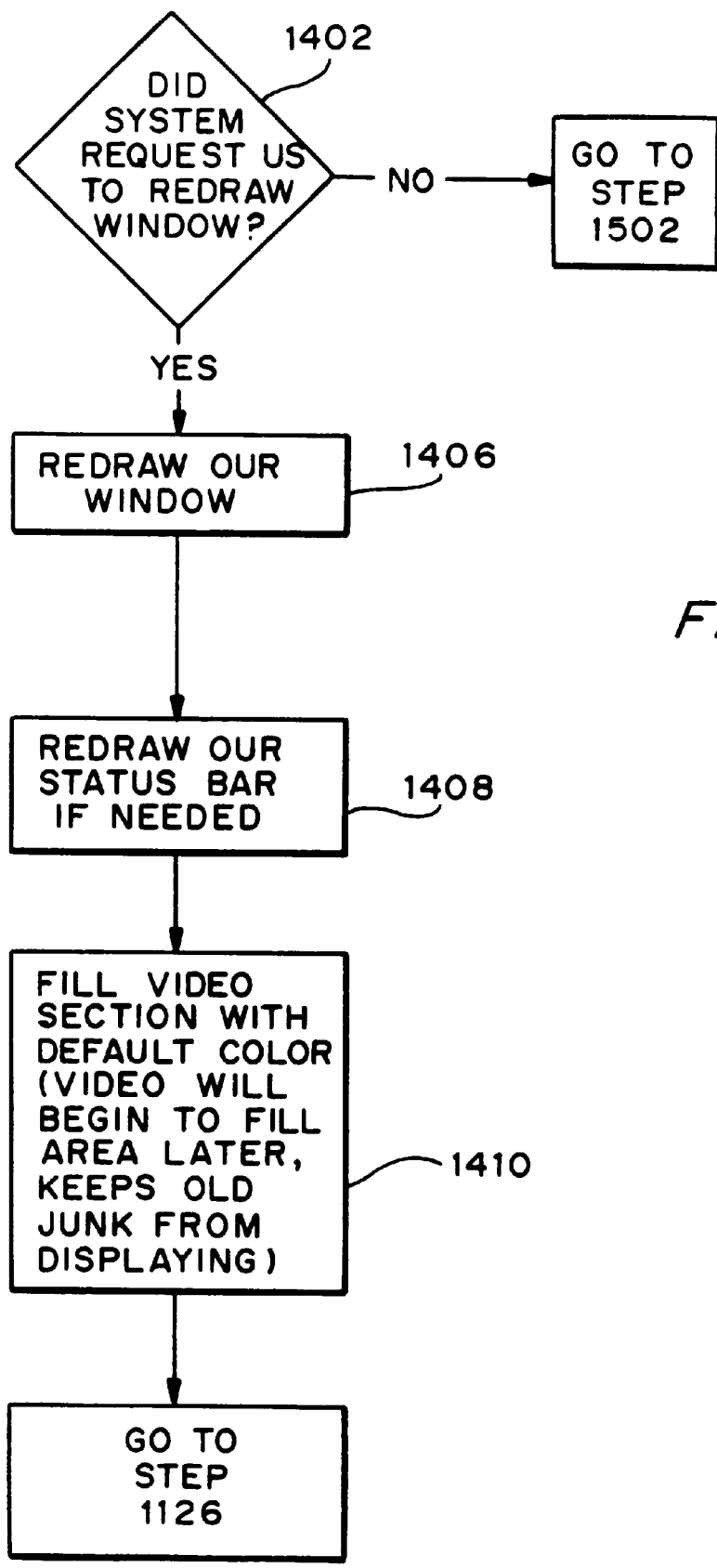
FIG. 14 illustrates processing that occurs when the system requests a window redraw in a preferred embodiment of software according to the present invention.

FIG. 14 illustrates processing that occurs when the system requests a window redraw. The software, in step 1402, determines whether the operating system requested a redrawing of the window. If a redraw is not requested, processing continues at step 1502. In step 1406, the software redraws the main window. In step 1408, the software redraws the status bar if the status bar is visible. The software, in step 1410, fills the video section of the window with a default color. This step is performed to prevent previous material from displaying in the area. When new video signals are received, the new video picture will fill the redrawn area. Program control continues at step 1126.

Figure 15:
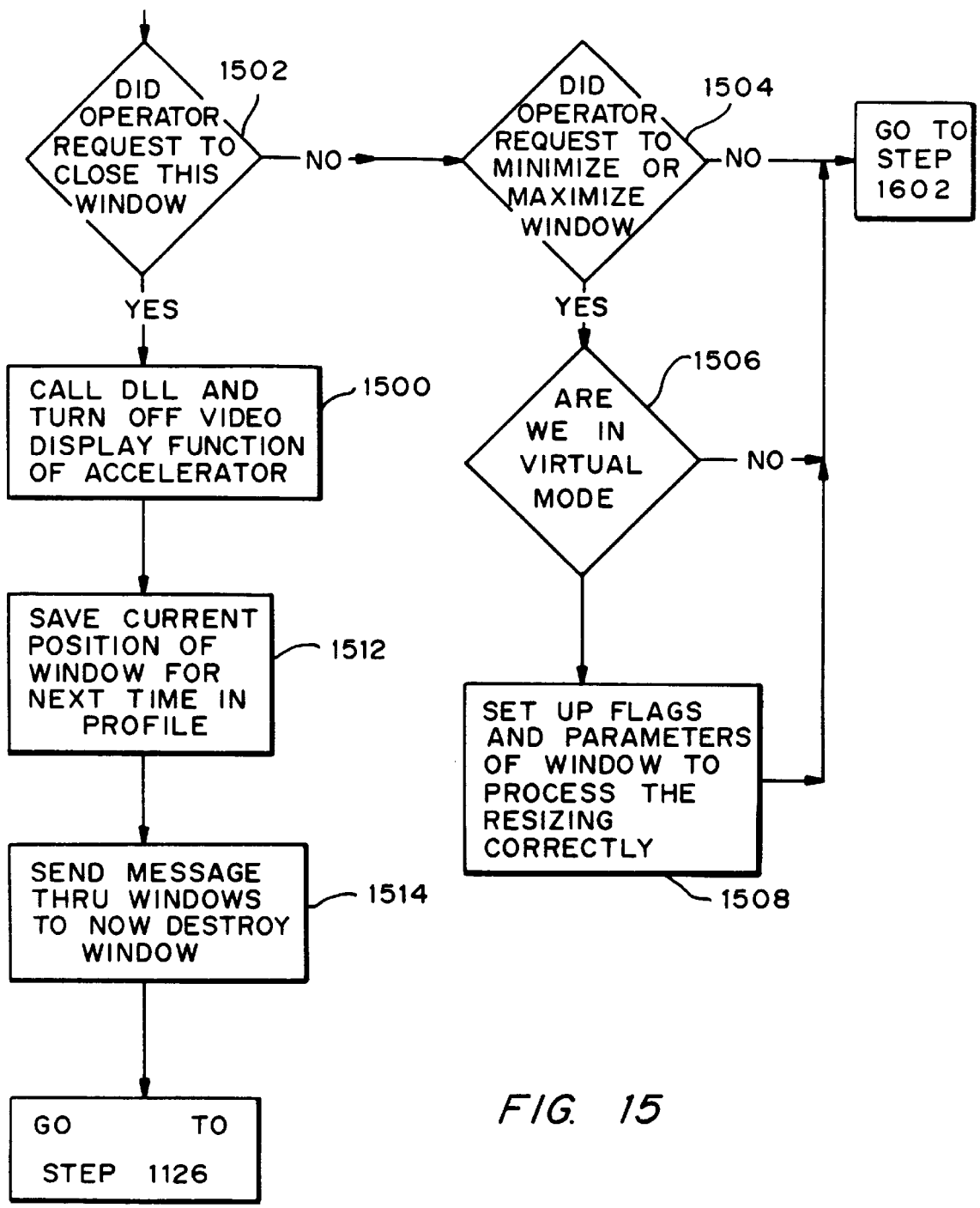
FIG. 15 illustrates processing that occurs when the user requests that a window be closed in a preferred embodiment of software according to the present invention.

FIG. 15 illustrates processing that occurs when the user requests that a window be closed. In step 1502, the software monitors a request to close the window. If no request to close the window is made, the software goes to step 1602. If no request is made to minimize or maximize the window, the software checks to see if the system is in virtual mode. If the system is in virtual mode, the software creates flags and parameters for the window to correctly process the resizing. Program control then continues at step 1602. If the user requests that a window be closed, the software goes to step 1510 and calls the DLL to turn off the video display function of the accelerator. In step 1512, the program saves the current position of the window for later use. In step 1514, the software sends a message to destroy the window to the operating system. The software then exits the main window procedure.

Figure 16:
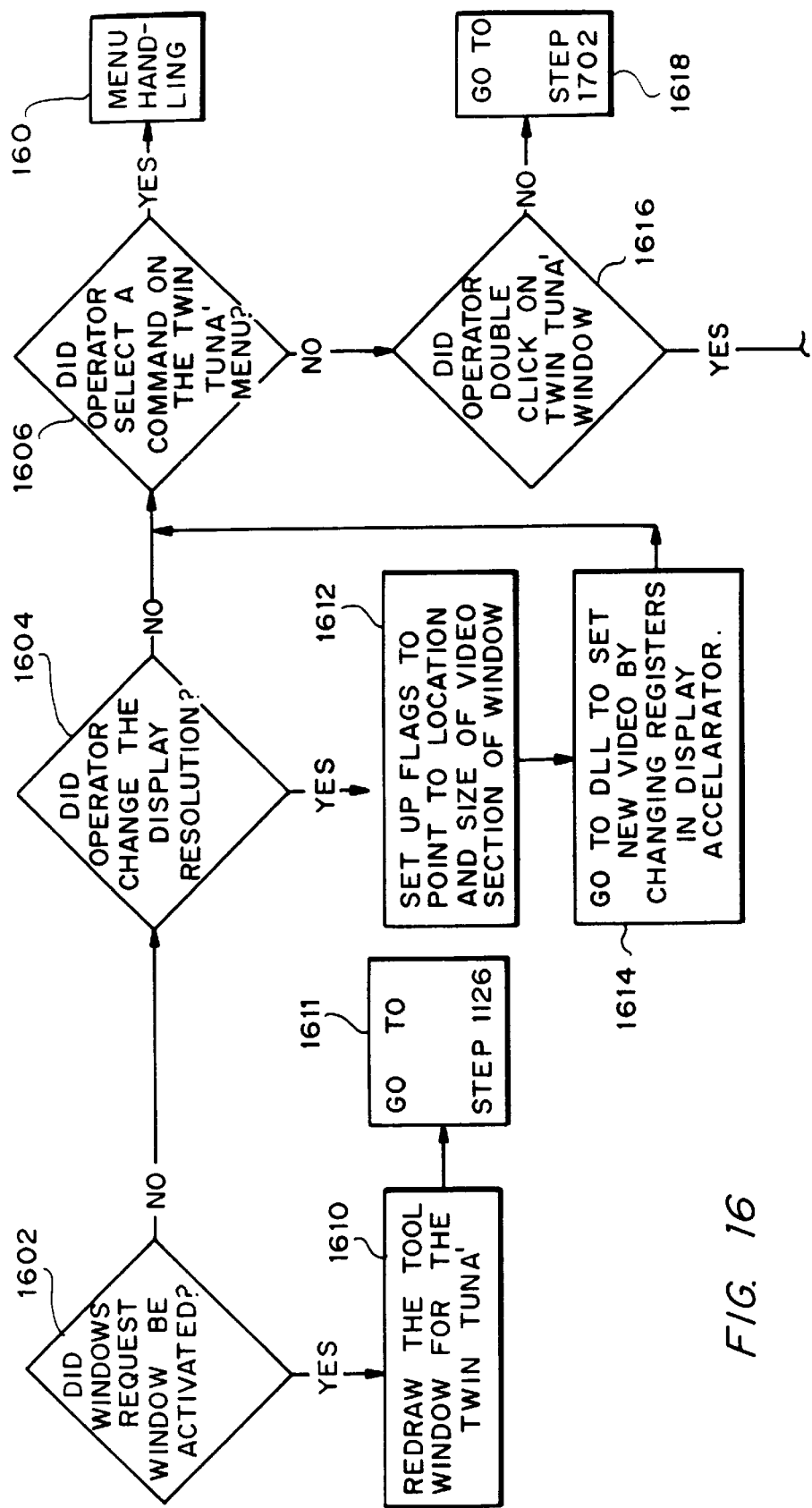
FIGS. 16 and 16A illustrate processing that occurs when the user opens a menu in a preferred embodiment of software according to the present invention.
Figure 16A:
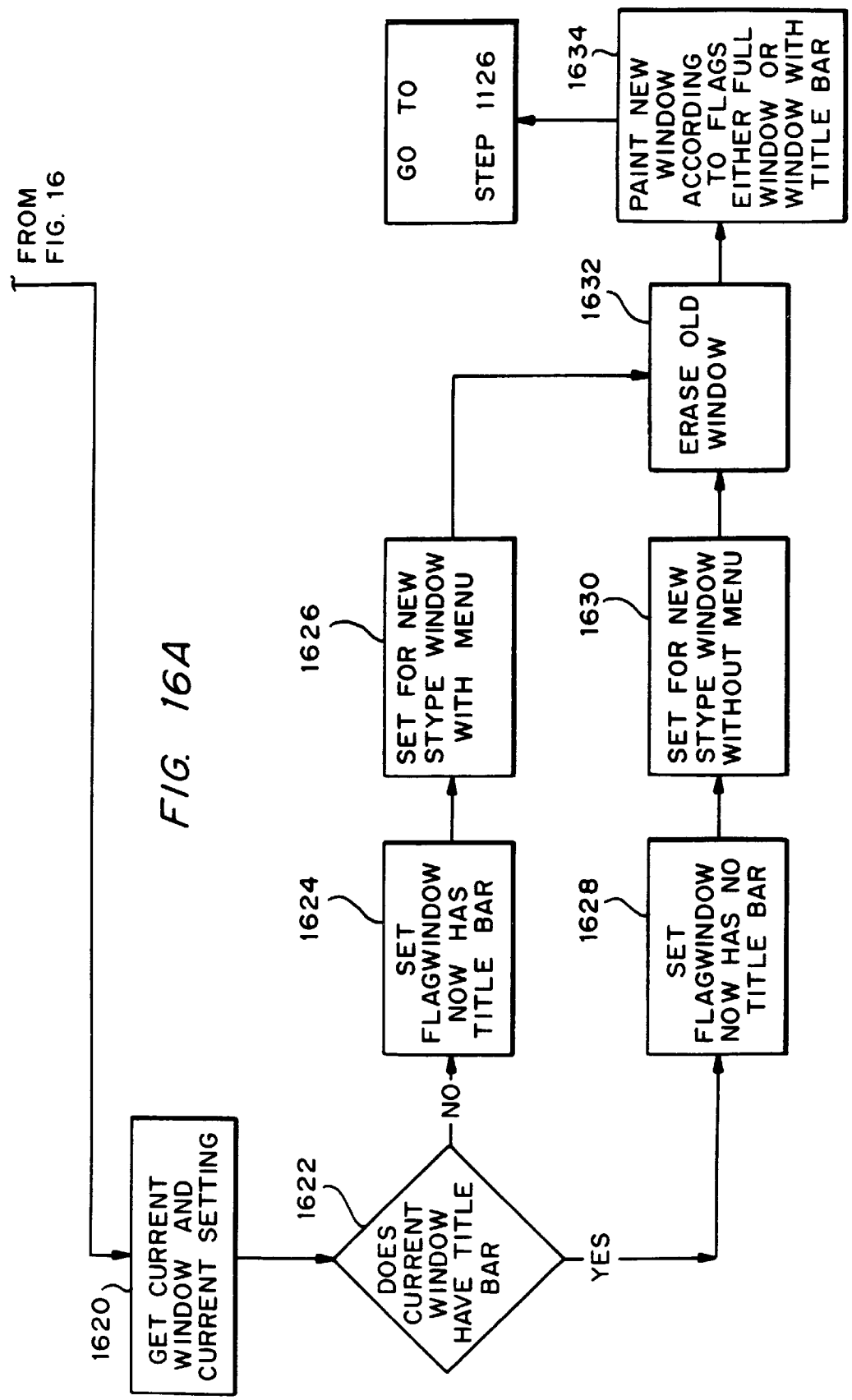

FIGS. 16 and 16A illustrate processing that occurs when the user opens a menu. In step 1602, the software determines whether the operating system requested that a window be activated. If no request from the operating system was received, the software monitors a change in the display resolution at step 1604. If no change to the display resolution is made, the system looks for the selection of a command on the software menu at step 1606. Menu processing is discussed below. If the operating system requests that a window be activated, the software, in step 1610, updates the tool window and exits the Window procedure. If the user changes the display resolution, the software, in step 1612, creates flags to point to the location and size of the video portion of the window. In step 1614, the software enters the DLL to set the new video modifying the registers in the display accelerator. Processing then goes to step 1606.

If the user does not select a command on the menu, the software looks for a double-click in the window. If no double-click is received, the software continues at step 1702. If a double-click is received, the software, in step 1618, obtains the current window and current setting. In step 1620, the software looks for a title bar in the window. If the window has no title bar, the software, in step 1624, sets a NO_MENU flag to provide a title bar for the window. The window is also given a menu in step 1626. The old window is then erased. If the window has a current title bar, a flag is set to remove the title bar. The new window is modified to remove the menu in step 1630 and the old window is then erased. In step 1634, the new window is painted according to the set flags (i.e., either a full window or a window with a title bar and menu).

Figure 17:
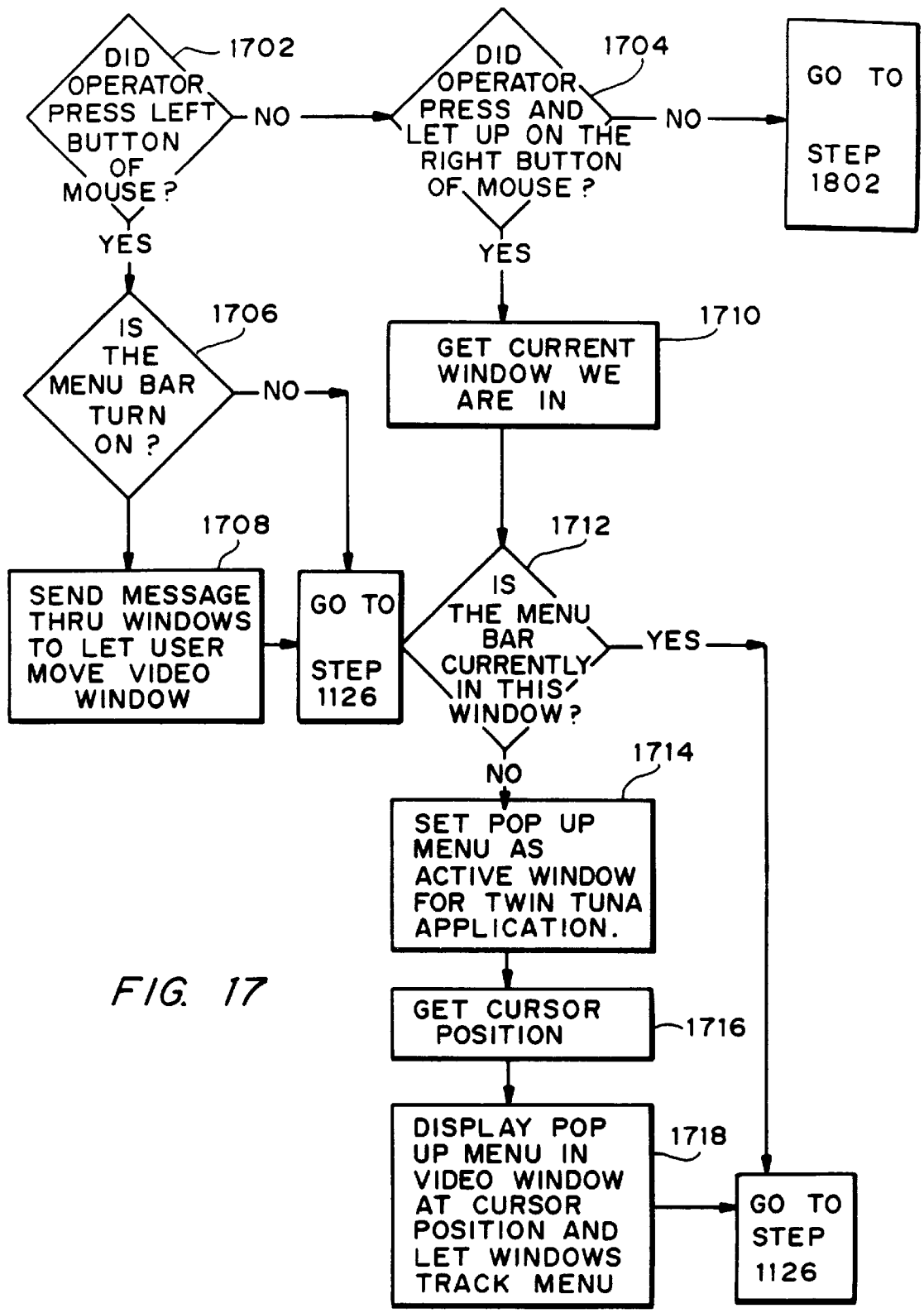
FIG. 17 is a flow chart illustrating processing that occurs when the user clicks a mouse button in the main window in a preferred embodiment of software according to the present invention.

FIG. 17 is a flow chart illustrating processing that occurs when the user clicks a mouse button in the main window. In step 1702, the software looks for a left mouse button click. If no left mouse button click is received, the software looks for a right mouse button click in step 1704. If a left mouse button click is received, the software determines whether the menu bar is on or off. If the menu bar is off, messages are sent through Windows to allow the user to move the video window in step 1708. If the menu bar is on, the Windows procedure exits. If a right mouse button click is received, the software obtains the current window the user is in. If no menu bar is on in the current window, the software creates the pop-up menu described above as the active window of the application in step 1714. The software then obtains the current cursor position in step 1716. Finally, the software displays the pop-up menu in the video window at the cursor position and allows Windows 95 to track the menu. The Windows procedure then exits.

Figure 18:
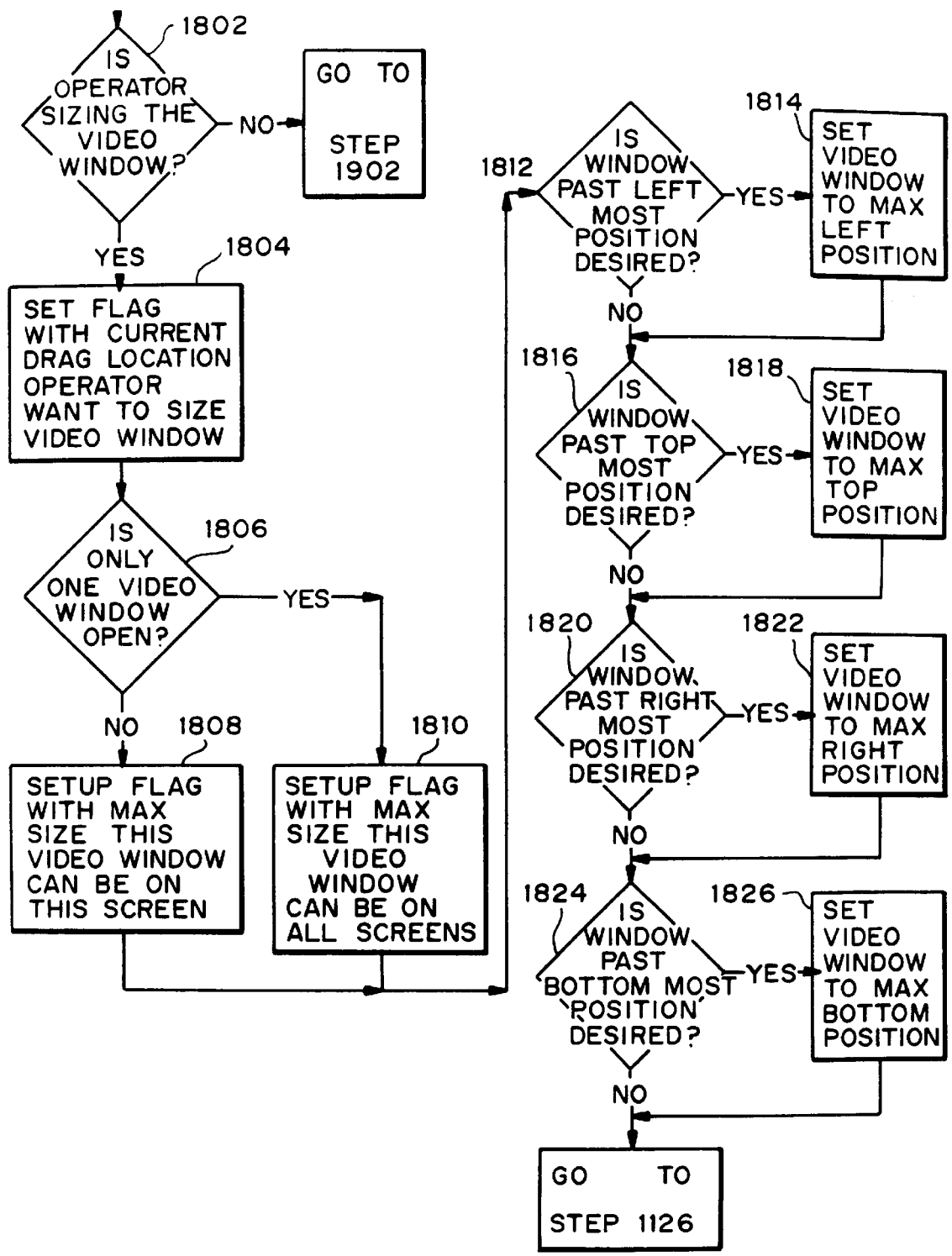
FIG. 18 illustrates processing that occurs during sizing of a video window in a preferred embodiment of software according to the present invention.

FIG. 18 illustrates processing that occurs when the user sizes a video window. If no right or left mouse button is received and no double-click is received, the software determines whether the user is sizing the video window at step 1802 in FIG. 16. If the user is not sizing the video window, processing continues at step 1902. Otherwise, the software, at step 1806, creates a flag with the current drag location where the user would like to size the window. If only one video window is open, a flag is created with the maximum size that the current window can be on all screens. If other windows are open, the software, in step 1808, creates a flag with the maximum size the video window can be on this screen alone. In steps 1812–1826, the software determines whether the window is sized past the farthest desired point. If the window is beyond that point, the video window is set to the maximum desired position. The Windows procedure then exits.

Figure 19:
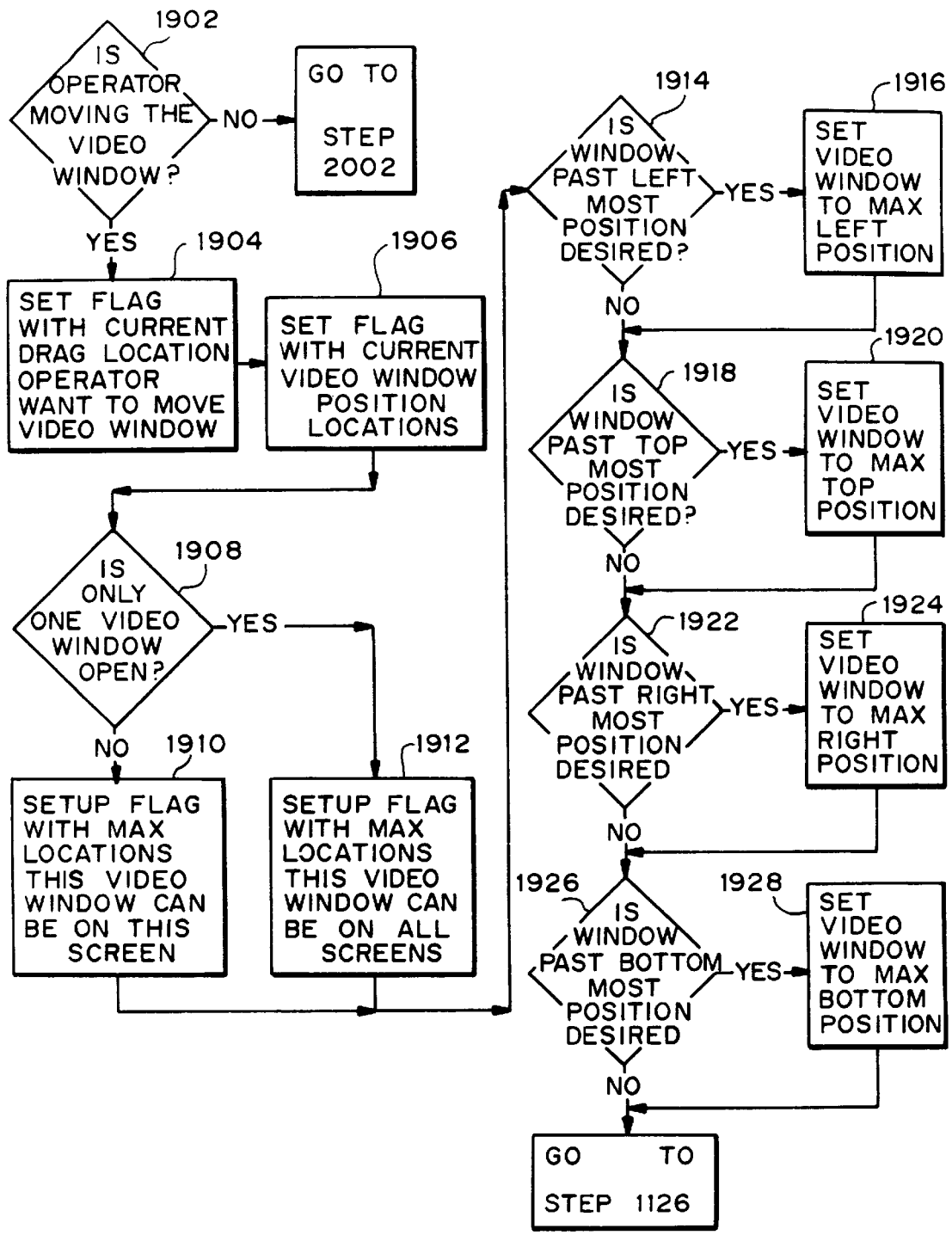
FIG. 19 is a flow chart illustrating processing that occurs during moving of a video window in a preferred embodiment of software according to the present invention.

FIG. 19 is a flow chart illustrating processing that occurs during moving of a video window. In step 1902, the software determines whether the user is moving the video window. If the user is not moving the video window, the software looks for a system message in step 2002. If the user is moving the video window, the software, in step 19046, creates a flag with the current location to which the window has been dragged by the user. In step 1906, the software creates a flag with the current video window position location. If only one video window is open, a flag is created with the maximum size that the current window can be on all screens. If other windows are open, the software, in step 1912, creates a flag with the maximum size the video window can be on this screen alone. In steps 1914–1928, the software determines whether the window is past the farthest desired point. If the window is beyond that point, the video window is set to the maximum desired position. The Windows procedure then exits.

Figure 20:
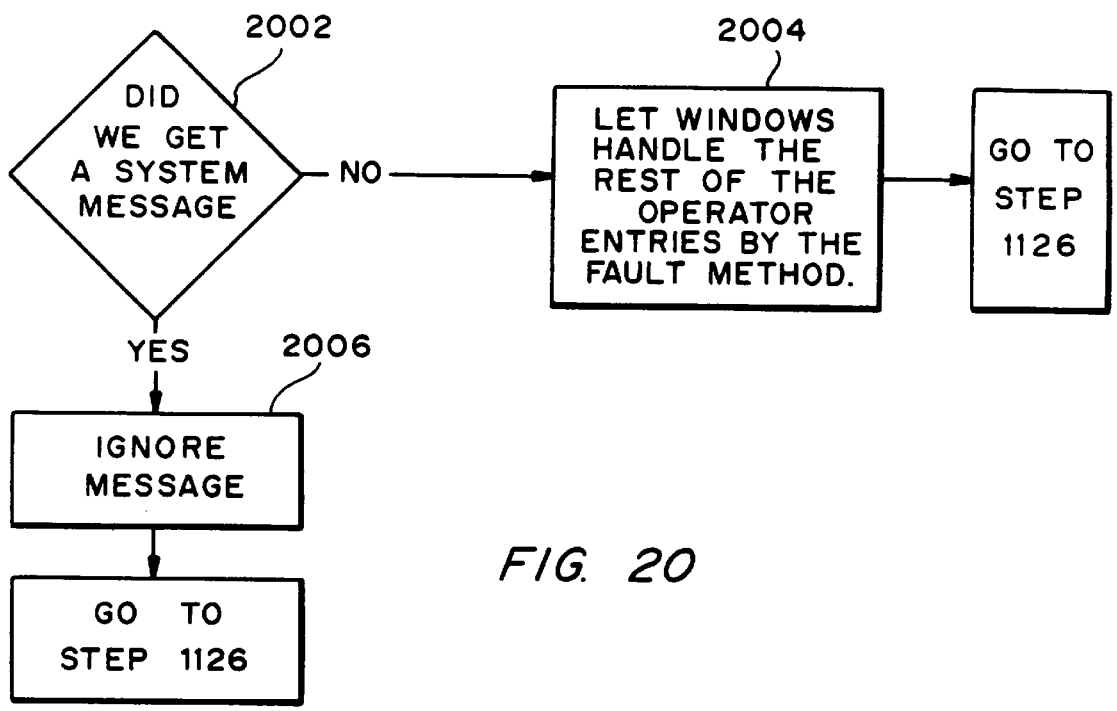
FIG. 20 is a flow chart illustrating the handling of system messages in a preferred embodiment of software according to the present invention.

FIG. 20 is a flow chart illustrating the handling of system messages by the software. If a system message is not received, the software, in step 2004, allows windows to handle all remaining user entries by the default method. If a system message is received, the software ignores the message in step 2006. The Windows procedure then exits.

Figure 21:
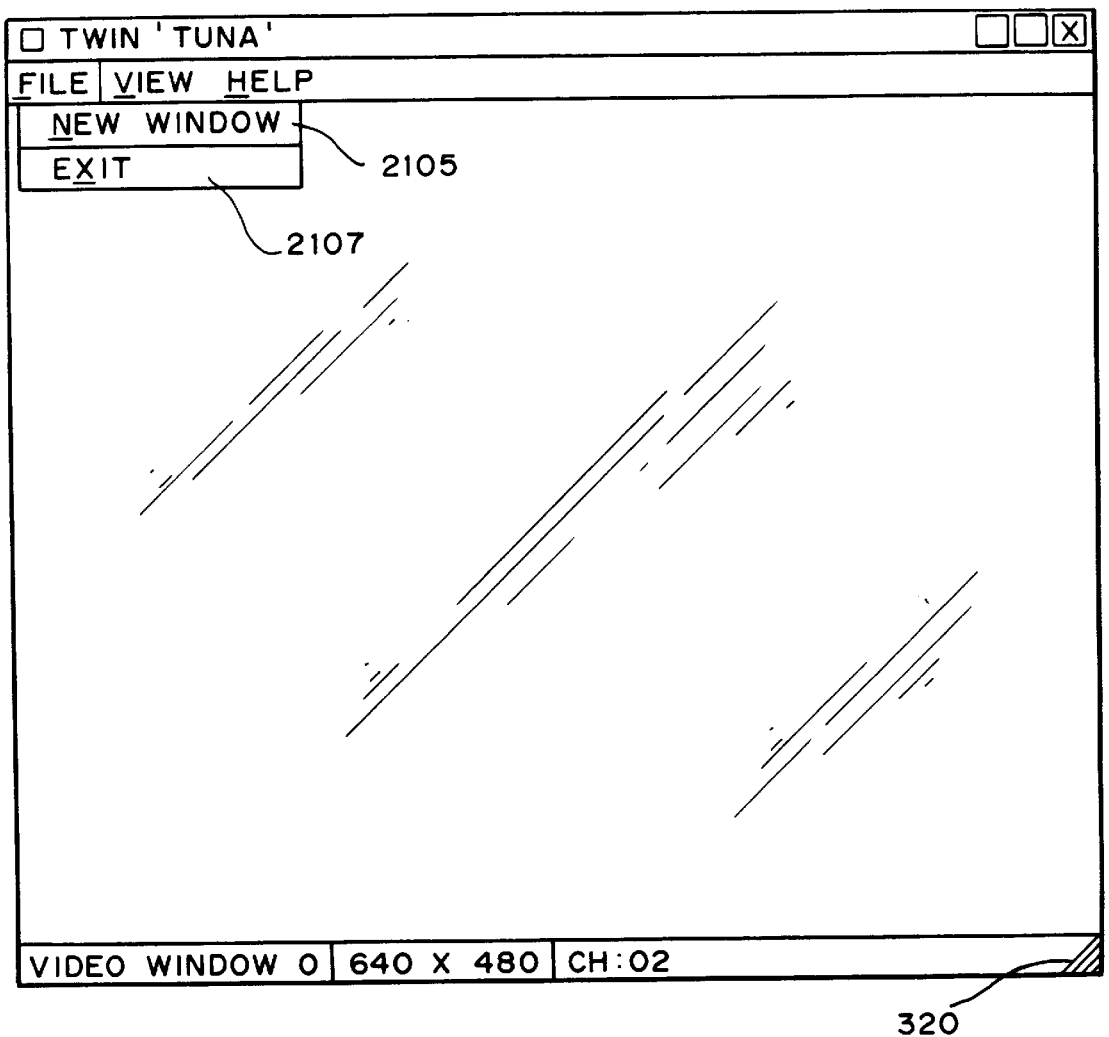
FIG. 21 illustrates a File Menu displayed when the user selects "File" from the main program menu in a preferred embodiment of software according to the present invention.

Menu control flow will now be described. FIG. 21 illustrates a File Menu displayed when the user selects "File" from the main program menu. The File Menu 2102 includes three menu items: a "New Window" menu item 2105, a blank line, and an "Exit" menu item 2107. When "New Window" is selected, the software opens a new window containing data from a new video source. The new window is opened on the next available monitor. The selection of audio and video sources will be described below. The program terminates when the user selects "Exit" from the File menu 2102.

Figure 22:
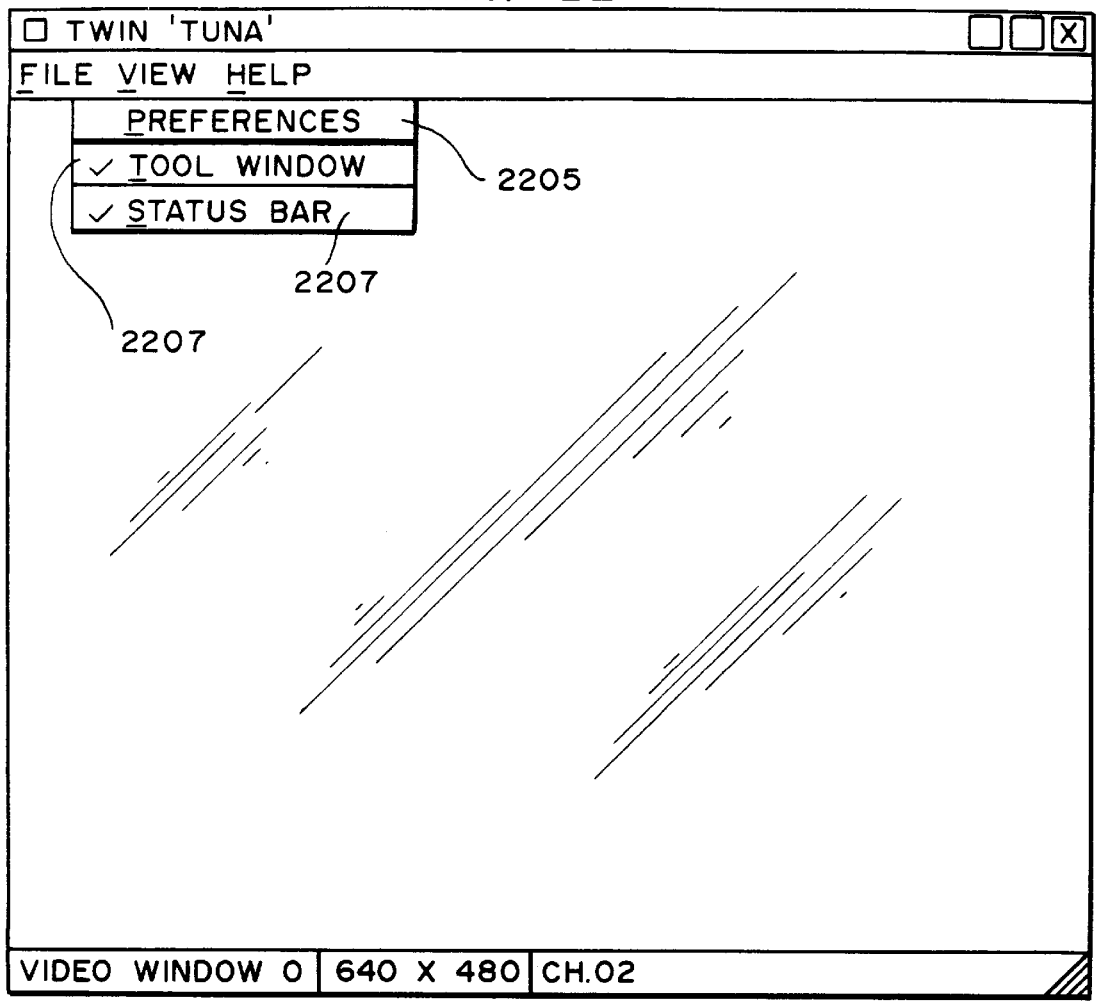
FIG. 22 illustrates a View Menu displayed when the user selects "View" from the main program menu in a preferred embodiment of software according to the present invention.

FIG. 22 illustrates a View Menu displayed when the user selects "View" from the main program menu. The View Menu includes three menu items: a "Preferences" menu item 2205, a "Tool Window" menu item 2207, and a "Status Bar" menu item 2209. When the Preferences menu item 2205 is selected, the software creates a dialog box containing the current setting for tuner input. Specifically, the dialog box indicates whether an air antenna or cable is selected. In addition, the type of cable selected is displayed. The user also has the option of keeping the Tool Window on top of multiple windows. Other information may be included in the Preferences menu, such as the audio connections, external video names, etc.

When the "Tool Window" item 2207 is selected from the Preferences menu, a check is entered next to the item and a Tool Window 2302 (see FIG. 23) is displayed. When the "Status Bar" menu item 2209 is selected, the status bar 320 is displayed. Both the Tool Window and the status bar may be toggled on and off.

Figure 23:
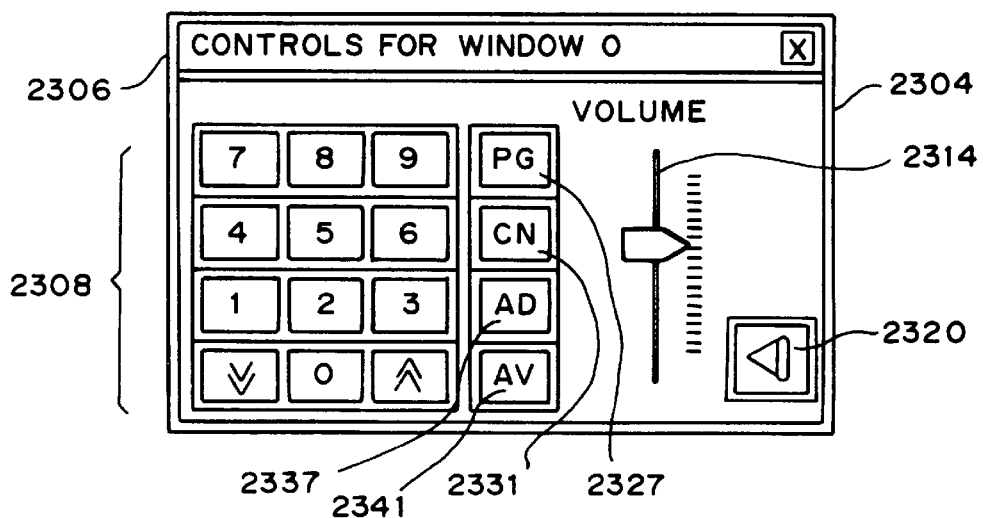
FIG. 23 illustrates a Tool Window 2302 that is displayed when the user selects "Tool Window" from the View Menu or from the Pop-up menu in a preferred embodiment of software according to the present invention.

FIG. 23 illustrates a Tool Window 2302 that is displayed when the user selects "Tool Window" from the View Menu or from the Pop-up menu. The Tool Window contains a title bar 2306 and a main window 2304. The main window 2304 includes a keypad 2308, a volume slider 2314, and a mute button 2320. The keypad 2308 allows the user to select particular audio and video settings for the active window. The keypad 2308 includes a "PC" button 2327 that allows the user to select the previously-tuned channel. A "CN" button 2331 allows the user to modify the name of the channel (e.g., "ABC") for the currently-tuned channel. The "AD" button 2337 allows the user to modify the audio characteristics of the active window. The "AV" button 2341 opens an audio/video window 2402 that is discussed in greater detail below. The volume slider 2314 allows the user to increase or decrease the volume within a particular window. The volume slider 2314 controls the volume for either window. The volume may be muted by pressing the mute button 2320.

Figure 24:
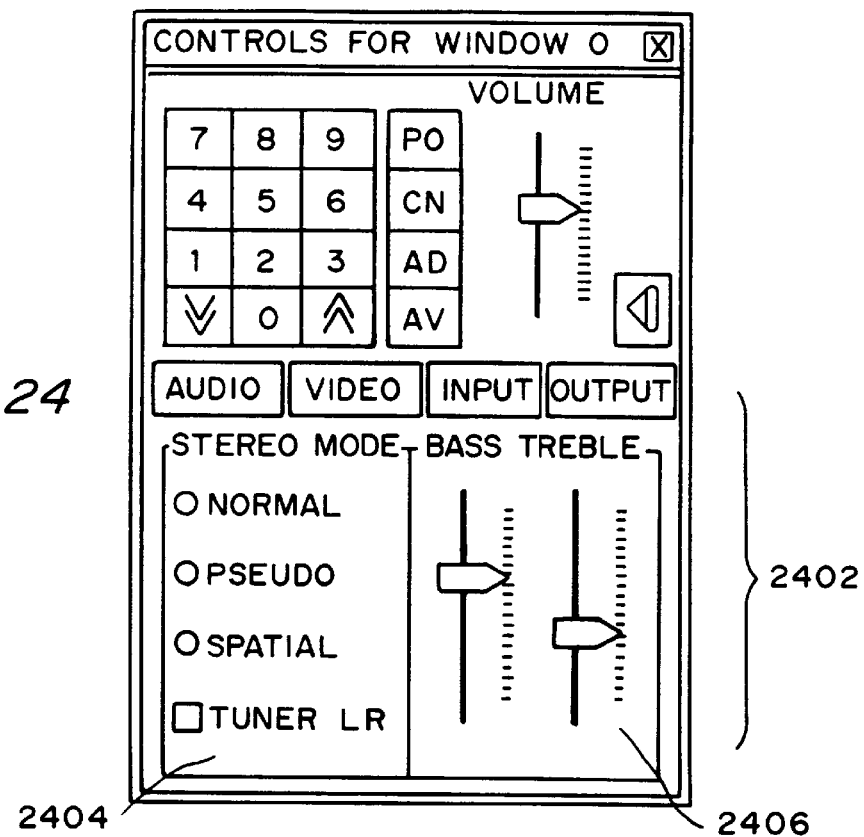
FIG. 24 illustrates the Tool Window when an audio button is selected in a preferred embodiment of software according to the present invention.

When the user selects the "AV" button 2341 on the keypad 2308, an audio/video window 2402. The audio/video window 2402 allows the user to select particular audio and video input and output sources. In addition, the window 2402 allows the user to select specific audio and video characteristics of the active window. FIG. 24 illustrates the Tool Window when an audio button is selected. A stereo mode window 2404 lets the user select a particular stereo mode from a group of radio buttons. The user may select "Normal," "Pseudo," or "Spatial" stereo mode. In addition, the user may select the tuner LR check box that allows the user to hear both left and right audio simultaneously. A bass/treble window 2406 includes two slider controls for allowing the user to increase or decrease the amount of bass and/or treble in the volume. All audio selections are sent to the audio multiplexer and sound processor 295 via the control buses 237,239.

Figure 25:
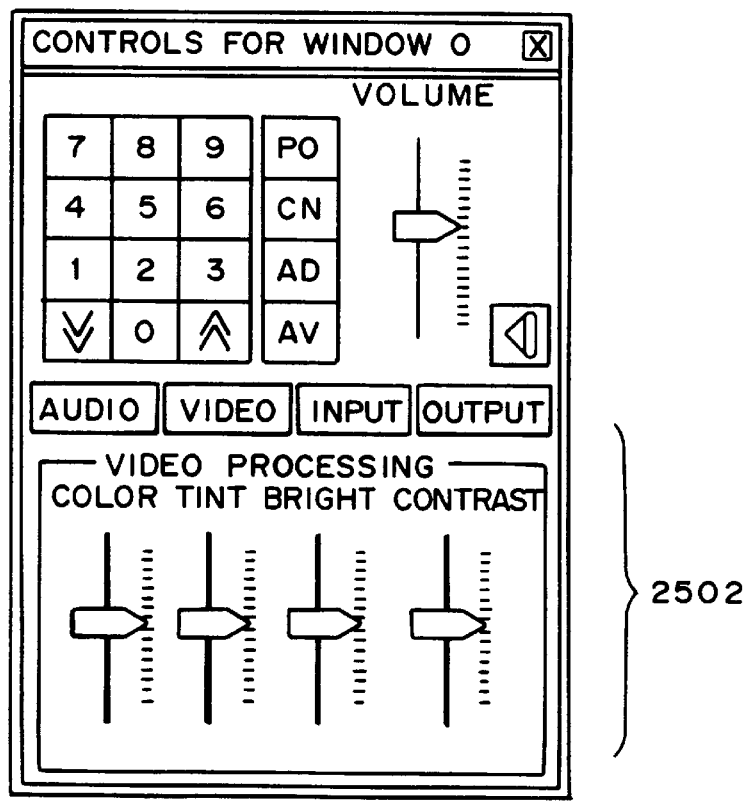
FIG. 25 illustrates the Tool Window when the user selects a video button in a preferred embodiment of software according to the present invention.

FIG. 25 illustrates the Tool Window when the video button in the Tool Window is selected. A video window 2502 opens allowing the user to adjust the video characteristics of the active window. Specifically, the user may adjust the color, tint, brightness, and contrast of the display using one or more slider controls.

Figure 26:
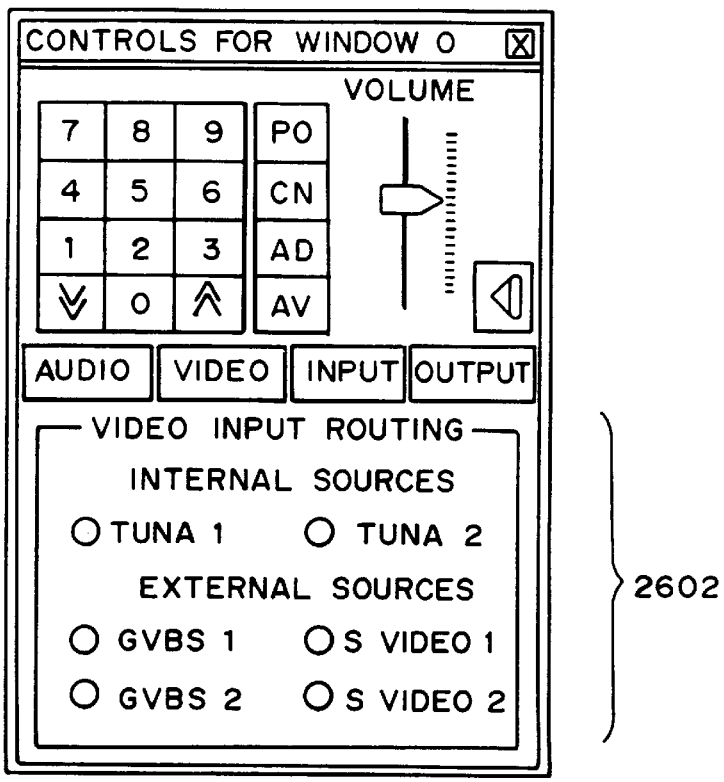
FIG. 26 illustrates the Tool Window when the user selects an input button in a preferred embodiment of software according to the present invention.

FIG. 26 illustrates the Tool Window when the user selects an input button. A video input routing window 2602 allows the user to use either internal or external sources for the video. If an internal source is selected, the user may toggle back and forth between two open screens using the "Tuner 1" or "Tuner 2" radio buttons. If an external source is selected, the user may select among two CVBS inputs and two S-Video inputs.

Figure 27:
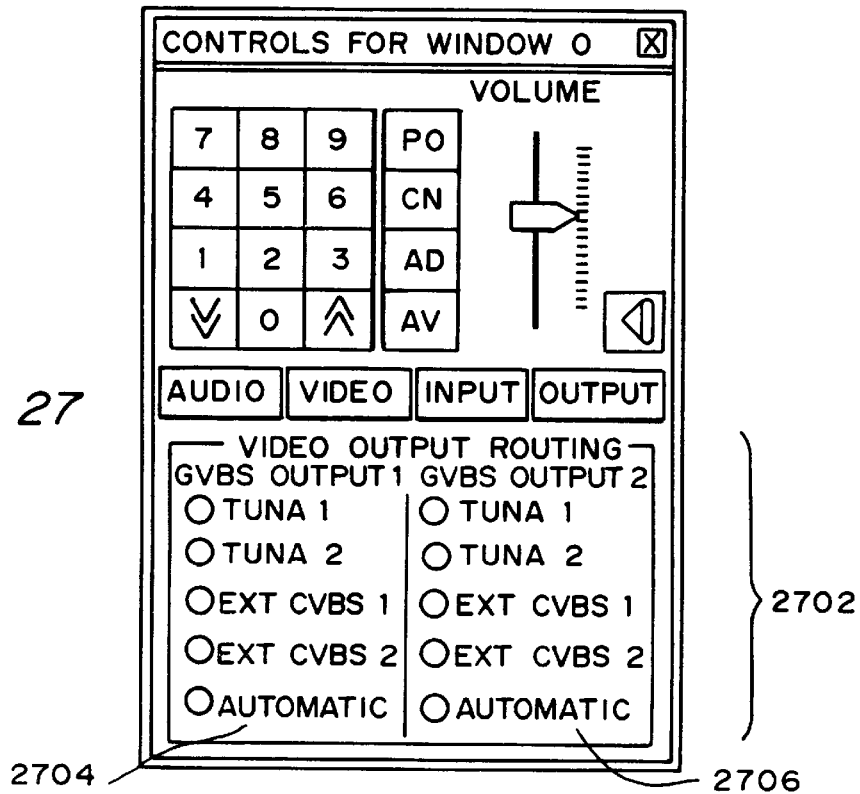
FIG. 27 illustrates the Tool Window when the user selects an output button in a preferred embodiment of software according to the present invention.

FIG. 27 illustrates the Tool Window when the user selects an output button. A video output routing window 2702 opens allowing the user to send the input source to one or more different output cables. Options for the first output cable are represented in the CVBS Output 1 window 2704. Options for the second output cable are represented in the CVBS Output 2 window 2706. Both output cables may display information from the Tuner 1 input, the Tuner 2 input, the external CVBS 1 input, and the external CVBS 2 input. An automatic button makes the first cable follow the first video window and the second video cable follow the second video window.

Having thus described a preferred embodiment of a video adapter, it should be apparent to those skilled in the art that certain advantages have been achieved. It should also be appreciated that various modifications, adaptations, and alternative embodiments thereof may be made within the scope and spirit of the present invention. For example, analog video signals have been illustrated, but it should be apparent to those skilled in the art that the teachings described herein would be applicable to digital video signals as well.

The invention is further defined by the following claims:

1. A video adapter for use in a computer, comprising:
    a first graphic accelerator adapted to couple to at least a first display device in order to display at least some output from the first graphic accelerator on the first display device;
    a second graphic accelerator adapted to couple to at least a second display device in order to display at least some output from the second graphic accelerator on the second display device;
    at least one television rendering functionality for coupling to a source that provides at least one television signal, and transforming said signal for use by at least one of said graphic accelerators;
    whereby the video adapter is adapted to provide simultaneously a different display on each of said display devices; and
    whereby output from at least one of said graphic accelerators contains an interactive presentation that allows selection of which display device on which to present information from said television rendering functionality.

2. The video adapter according to claim 1 in which selection of which display device presents information from said television rendering functionality occurs at least in part by coupling output from the television rendering functionality to the graphic accelerator coupled to the selected display device.

3. A video adapter according to claim 1 in which selection of which display device presents information from said television rendering functionality also occurs at least in part by coupling output from the graphic accelerator containing said information to the selected display device.

4. A video adapter according to claim 1 in which the television rendering functionality contains a tuner.

5. A video adapter according to claim 4 in which the television rendering functionality contains a video decoder.

6. The video adapter according to claim 1 in which the television rendering functionality contains a tuner and a decoder.

7. A video adapter according to claim 1 in which said video adapter is digital and said television rendering functionality contains capacity for transforming a digital television signal into output for use by at least one of the graphic accelerators.

8. A video adapter for use in a computer, comprising:
    a first graphic accelerator adapted to couple to at least a first display device in order to display at least some output from the first graphic accelerator on the first display device;
    a second graphic accelerator adapted to couple to at least a second display device in order to display at least some output from the second graphic accelerator on the second display device;
    at least one television rendering functionality for coupling to a source that provides at least one television signal, and transforming said signal for use by at least one of said graphic accelerators;
    whereby the video adapter is adapted to provide simultaneously a different display on each of said display devices; and
    whereby output from at least one of said graphic accelerators contains an interactive presentation that allows selection of which display device on which to present information from said television rendering functionality; and
    whereby selection of which display device presents information from said television rendering functionality occurs at least in part by coupling output from the television rendering functionality to the graphic accelerator coupled to the selected display device.

9. A video adapter according to claim 8 whereby said output from at least one of the graphic accelerators contains an interactive presentation that allows, for each display device, selection of a presentation on that device.

10. A video adapter according to claim 8 whereby said output from at least one of the graphic accelerators contains an interactive presentation that allows, for each display device, selection of qualities of a presentation on that device.

11. A video adapter according to claim 8 whereby at least two of said graphic accelerators are adapted simultaneously to process output from one television rendering functionality, in order simultaneously to display part of the information from said functionality on one of said display devices and another part of the information from said functionality on another of said display devices.

12. A video adapter according to claim 8 whereby at least two of said graphic accelerators are adapted simultaneously to process output from two independent sources, in order to display content on one of the display devices that is completely independent of content displayed on another of the display devices.

13. A process for displaying different content on two display devices simultaneously and in a manner whereby the content on each display device is independently controlled, comprising:

a. providing a first display device;
 b. providing a second display device;
 c. providing a video feed;
 d. providing digital data:
 e. providing a computer that contains an adapter, the adapter in turn including:
  a first graphic accelerator adapted to couple to at least one of the display devices in order to display at least some output from the first graphic accelerator on at least one of the display devices;
  a second graphic accelerator adapted to couple to at least one of the display devices in order to display at least some output from the second graphic accelerator on at least one of the display devices;
  at least on televisions rendering functionality for coupling to a source that provides at least one television signal, and transforming said signal for use by at least one of said graphic accelerators;
  whereby the adapter is adapted to provide simultaneously a different display on each of said display devices; and
  whereby output from at least one of said graphic accelerators contains an interactive presentation that allows selection of which display device on which to present information from said television rendering functionality;

f. presenting an interactive presentation on at least two of the display devices simultaneously using said adapter, the presentation allowing a user to select which display device presents content corresponding to said video feed;
 g. selecting, using said interactive presentation, at least one particular display device on which to present said content corresponding to said video feed, and
 h. in accordance with said selection, presenting said content corresponding to said video feed on said at least one particular display device.

14. A process according to claim 13, further comprising selecting, using said interactive presentation, at least one particular display device on which to present content corresponding to said digital data; and, in accordance with said selection, presenting said content corresponding to said digital data on said at least one particular display device.

15. A process according to claim 14 further comprising presenting, on the same display device that presents information corresponding to the video feed, information corresponding to the digital data.

16. A process according to claim 13 further comprising presenting, on a different display device from the device that presents information corresponding to the video feed, information corresponding to the digital data.

17. A process according to claim 13 in which said video feed is analog and the process further comprises demodulating said video feed in order to transform the feed for use by at least one of the graphic accelerators.

18. A process according to claim 13 in which said video feed is digital and the process further comprises transforming the video feed for use by at least one of the graphic accelerators.

19. A process according to claim 13 further comprising presenting information corresponding to a first video feed on a first display device and information corresponding to a second video feed on a second display device.

20. A process according to claim 13 further comprising presenting information corresponding to first digital data on a first display device and information corresponding to second digital data on a second display device.

* * * * *